(12) United States Patent
Bahadur et al.

(10) Patent No.: US 9,923,798 B1
(45) Date of Patent: Mar. 20, 2018

(54) DYNAMIC LOAD BALANCING OF NETWORK TRAFFIC ON A MULTI-PATH LABEL SWITCHED PATH USING RESOURCE RESERVATION PROTOCOL WITH TRAFFIC ENGINEERING

(75) Inventors: Nitin Bahadur, Santa Clara, CA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1193 days.

(21) Appl. No.: 13/536,757

(22) Filed: Jun. 28, 2012

(51) Int. Cl.
*H04L 12/701* (2013.01)

(52) U.S. Cl.
CPC .................................... *H04L 45/00* (2013.01)

(58) Field of Classification Search
CPC . H04L 12/5689; H04L 45/502; H04L 47/826; H04Q 2011/0079
USPC ........................... 370/254–350; 709/201–213
See application file for complete search history.

(56) References Cited

U.S. PATENT DOCUMENTS

| | | | |
|---|---|---|---|
| 4,199,663 | A | 4/1980 | Herzog |
| 6,091,725 | A | 7/2000 | Cheriton et al. |
| 6,118,760 | A | 9/2000 | Zaumen et al. |
| 6,243,667 | B1 | 6/2001 | Kerr et al. |
| 6,653,005 | B1 | 4/2003 | Skirmont et al. |
| 6,651,099 | B1 | 11/2003 | Dietz et al. |
| 6,909,713 | B2 | 6/2005 | Magnussen et al. |
| 6,980,550 | B1 | 12/2005 | Yip et al. |
| 7,151,775 | B1 * | 12/2006 | Renwick et al. ............ 370/400 |
| 7,206,861 | B1 | 4/2007 | Callon |
| 7,277,386 | B1 | 10/2007 | Ferguson et al. |
| 7,606,235 | B1 * | 10/2009 | Ayyangar ............... H04L 45/00 370/395.21 |
| 7,633,871 | B1 | 12/2009 | Callon |
| 7,808,898 | B2 | 10/2010 | Eswaran et al. |
| 7,948,996 | B2 * | 5/2011 | Kompella ..................... 370/400 |
| 8,004,990 | B1 | 8/2011 | Callon |
| 8,107,363 | B1 | 1/2012 | Saluja |
| 8,218,553 | B2 * | 7/2012 | Kompella ............. H04L 45/125 370/395.5 |

(Continued)

OTHER PUBLICATIONS

Viswanathan et al., "Evolution of Multiprotocol Label Switching," IEEE Communications Magazine, May 1998, pp. 165-173.

(Continued)

*Primary Examiner* — Ayaz Sheikh
*Assistant Examiner* — Debebe Asefa
(74) *Attorney, Agent, or Firm* — Shumaker & Sieffert, P.A.

(57) ABSTRACT

Techniques are describe for establishing an overall label switched path (LSP) for dynamic load balancing of network traffic being sent across a network using the a resource reservation protocol such as Resource Reservation Protocol with Traffic Engineering (RSVP-TE). The tunnel may be a single RSVP-TE Label Switched Path (LSP) that is configured to automatically and dynamically load balance network traffic across different sub-paths of the RSVP-TE LSP over the network. The ingress device of the overall multi-path LSP can analyze traffic statistics to determine when a network traffic demand differs from a currently reserved bandwidth of the overall multi-path LSP by at least a threshold amount, and can automatically add or remove a sub-path from the overall multi-path LSP to adjust capacity of the overall multi-path LSP to correspond to the currently reserved bandwidth.

39 Claims, 13 Drawing Sheets

(56) References Cited

U.S. PATENT DOCUMENTS

| | | | |
|---|---|---|---|
| 8,279,754 B1* | 10/2012 | Minei et al. | 370/230 |
| 8,570,871 B2* | 10/2013 | Yong et al. | 370/235 |
| 2001/0043585 A1 | 11/2001 | Hummel | |
| 2003/0137971 A1 | 7/2003 | Gibson et al. | |
| 2003/0231628 A1 | 12/2003 | Harada et al. | |
| 2004/0013113 A1 | 1/2004 | Singh et al. | |
| 2004/0258073 A1 | 12/2004 | Alexander et al. | |
| 2005/0160171 A1 | 7/2005 | Rabie et al. | |
| 2005/0169266 A1 | 8/2005 | Aggarwal et al. | |
| 2006/0098587 A1 | 5/2006 | Vasseur et al. | |
| 2006/0182035 A1 | 8/2006 | Vasseur | |
| 2007/0109015 A1 | 5/2007 | Hanes et al. | |
| 2007/0248084 A1 | 10/2007 | Whitehead | |
| 2008/0126565 A1 | 5/2008 | Osano et al. | |
| 2008/0219258 A1 | 9/2008 | Bowen et al. | |
| 2010/0024008 A1 | 1/2010 | Hopen et al. | |
| 2010/0214913 A1 | 8/2010 | Kompella | |

OTHER PUBLICATIONS

U.S. Appl. No. 12/425,517, filed Apr. 17, 2009, by Arun Kumar S P.

U.S. Appl. No. 10/208,250, filed Jul. 29, 2002, by Ross W. Callon.

U.S. Appl. No. 12/507,200, filed Jul. 22, 2009, by Kireeti Kompella.

Anderson et al., "LDP Specification," Network Working Group, RFC 3036, Jan. 2001, 124 pp.

Aggarwal et al., "Extensions to RSVP-TE for Point to Multipoint TE LSPs," Network Working Group, May 2005, 45 pp.

U.S. Appl. No. 11/508,096, entitled "Resource Reservation Protocol With Traffic Engineering Point to Multi-Point Label Switched Path Hierarchy," filed Aug. 22, 2006.

Kompella, "Multi-path Label Switched Paths Signaled Using RSVP-TE," Network Working Group, Internet Draft, Oct. 31, 2011, 19 pp.

U.S. Appl. No. 13/456,046, entitled "Load Balancing Network Traffic on a Label Switched Path Using Resource Reservation Protocol with Traffic Engineering," filed Apr. 25, 2012.

U.S. Appl. No. 13/112,961, entitled "Weighted Equal-Cost Multipath," filed May 20, 2011.

Pathak et al., "Latency Inflation with MPLS-based Traffic Engineering," Nov. 2011, 9 pp.

So et al., "Composite Link Framework in Multi Protocol Label Switching (MPLS)," Internet Draft, Mar. 7, 2012, 38 pp.

"Automatic Bandwidth Adjustment," Accessed May 29, 2012, Online: http://cisco-press-traffic-engineering.org.ua/1587050315/ch05lev1sec6.html, 4 pp.

Awduche et al., "RSVP-TE: Extensions to RSVP for LSP Tunnels," Dec. 2011, 61 pp.

\* cited by examiner

DYNAMIC LOAD BALANCING OF NETWORK TRAFFIC ON A MULTI-PATH LABEL SWITCHED PATH USING RESOURCE RESERVATION PROTOCOL WITH TRAFFIC ENGINEERING

TECHNICAL FIELD

The disclosure relates to computer networks and, more particularly, to engineering traffic flows within computer networks.

BACKGROUND

The term "link" is often used to refer to the connection between two devices on a computer network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Procedures for LDP by which label switching routers (LSRs) distribute labels to support MPLS forwarding along normally routed paths are described in L. Anderson, "LDP Specification," RFC 3036, Internet Engineering Task Force (IETF), January 2001, the entire contents of which are incorporated by reference herein. Another type of protocol is a resource reservation protocol, such as the Resource ReserVation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System-Intermediate System (ISIS) protocol or the Open Shortest Path First (OSPF) protocol. RSVP-TE establishes LSPs that follow a single path from an ingress device to an egress device, and all network traffic sent on the LSP must follow exactly that single path. The use of RSVP (Resource Reservation Protocol), including extensions to establish LSPs in MPLS are described in D. Awduche, RSVP-TE: Extensions to RSVP for LSP Tunnels, RFC 3209, IETF, December 2001, the entire contents of which are incorporated by reference herein.

SUMMARY

In general, techniques are described for dynamic load balancing of network traffic across multiple sub-paths of an overall multi-path label switched path (LSP). For example, an ingress router can dynamically adjust a number of sub-paths of an overall multi-path label switched path (LSP) to carry the traffic across a network between an ingress router and an egress router, and adjust bandwidth reservations for traffic flows across the available sub-paths. The techniques may include extensions to Resource Reservation Protocol with Traffic Engineering (RSVP-TE) to enable a router to establish an overall multi-path LSP that includes a plurality of sub-paths. The multi-path LSP may comprise a single overall LSP that is configured to carry load balanced network traffic across different sub-paths of the overall LSP over the network. The ingress router of the overall multi-path LSP dynamically and automatically adjusts the reserved bandwidth on the overall multi-path LSP in response to changes to traffic demand detected by the ingress router, such as by adding or removing sub-paths of the overall multi-path LSP, as well as by re-signaling the sub-paths of the overall multi-path LSP to modify the amount of reserved bandwidth on the sub-paths.

Providing an automatic bandwidth adjustment capability on an overall multi-path load balancing LSP can work well to accommodate a large increase in traffic demand, because the traffic can be load-balanced over a plurality of sub-paths of the overall multi-path LSP. Even though the individual sub-paths of the overall multi-path LSP may not have enough capacity to able to handle the large increase in traffic demand alone, the overall multi-path LSP as a whole has the capacity to handle the large amount of traffic by virtue of its multiple paths and the ability to add additional paths to the overall multi-path LSP that combine to provide the increased capacity.

The techniques may provide one or more advantages. For example, the techniques may allow devices within the network to automatically address dynamically changing bandwidth needs in a network, while making efficient use of the available bandwidth on various paths across the network. For example, instead of creating multiple independent LSPs between the same pair of endpoints and then trying to statically distribute traffic among these independent LSPs, the techniques allow an operator to configure an ingress router to establish a single RSVP-TE LSP between a pair of endpoints, the single RSVP-TE LSP having sub-paths on which the nodes in the LSP will automatically load balance traffic. This approach using distributed load balancing makes more effective use of available bandwidth than an approach that would require classifying traffic into pre-defined "buckets" at the ingress router.

In addition, the techniques described herein may reduce the amount of state needed to be maintained in the network, because the techniques would establish a single RSVP-TE LSP between a pair of endpoints rather than multiple independent LSPs between the same pair of endpoints. Furthermore, if a given node has multiple downstream sub-paths and an outage or other network failure (e.g., a link or node failure) occurs in one of the sub-paths, the given node can simply rebalance traffic among the remaining sub-paths, thus quickly and efficiently dealing with the failure. Load-balancing LSPs may therefore provide improved network resilience, without requiring dedicated links or tunnels to be established solely for fast reroute in failure cases.

In one example aspect, a method includes by an ingress device, establishing an overall multi-path label switched path (LSP) from the ingress device to an egress device, wherein the overall multi-path LSP includes a plurality of different sub-paths to the egress device that satisfy a traffic-engineering constraint, and forwarding received network traffic to the egress device over the overall multi-path LSP by load balancing the network traffic across the sub-paths of the overall multi-path LSP. The method also includes by the ingress device, analyzing traffic statistics for network traffic received at the ingress device on a tunnel interface associated with the overall multi-path LSP, and determining, by the ingress device, based on the analysis of the traffic statistics, that a network traffic demand detected by the ingress device on the tunnel interface differs from a currently reserved bandwidth of the overall multi-path LSP by at least a threshold amount. The method also includes in response to the determining, by the ingress device, automatically adding a sub-path to or removing a sub-path from the plurality of different sub-paths of the overall multi-path LSP to adjust capacity of the overall multi-path LSP to correspond to the network traffic demand.

In another example aspect, a network device includes a resource reservation protocol module to establish an overall multi-path label switched path (LSP) from the network device to an egress device, wherein the overall multi-path LSP includes a plurality of different sub-paths to the egress device that satisfy a traffic-engineering constraint, and a forwarding component to forward received network traffic to the egress device over the overall multi-path LSP by load balancing the network traffic across the sub-paths of the overall multi-path LSP. The network device further includes a physical interface configured to send the received network traffic across the sub-paths of the overall multi-path LSP, and a load balancing module that analyzes traffic statistics for network traffic received at the network device on a tunnel interface associated with the overall multi-path LSP, wherein the load balancing module determines, based on the analysis of the traffic statistics, that a network traffic demand detected by the ingress device on the tunnel interface differs from a currently reserved bandwidth of the overall multi-path LSP by at least a threshold amount, wherein in response to the determining, the network device automatically adds a sub-path to or removes a sub-path from the plurality of different sub-paths of the overall multi-path LSP to adjust capacity of the overall multi-path LSP to correspond to the network traffic demand.

In another example aspect, a computer-readable storage medium comprises instructions for causing a programmable processor to establish an overall multi-path label switched path (LSP) from an ingress device to an egress device, wherein the overall multi-path LSP includes a plurality of different sub-paths to the egress device that satisfy a traffic-engineering constraint, forward received network traffic to the egress device over the overall multi-path LSP by load balancing the network traffic across the sub-paths of the overall multi-path LSP, and analyze traffic statistics for network traffic received at the ingress device on a tunnel interface associated with the overall multi-path LSP. The computer-readable storage medium further comprises instructions to determine, based on the analysis of the traffic statistics, that a network traffic demand detected by the ingress device on the tunnel interface differs from a currently reserved bandwidth of the overall multi-path LSP by at least a threshold amount, and in response to the determining, automatically add a sub-path to or remove a sub-path from the plurality of different sub-paths of the overall multi-path LSP to adjust capacity of the overall multi-path LSP to correspond to the network traffic demand.

The details of one or more examples are set forth in the accompanying drawings and the description below. Other features, objects, and advantages will be apparent from the description and drawings, and from the claims.

DETAILED DESCRIPTION

Figure 1:
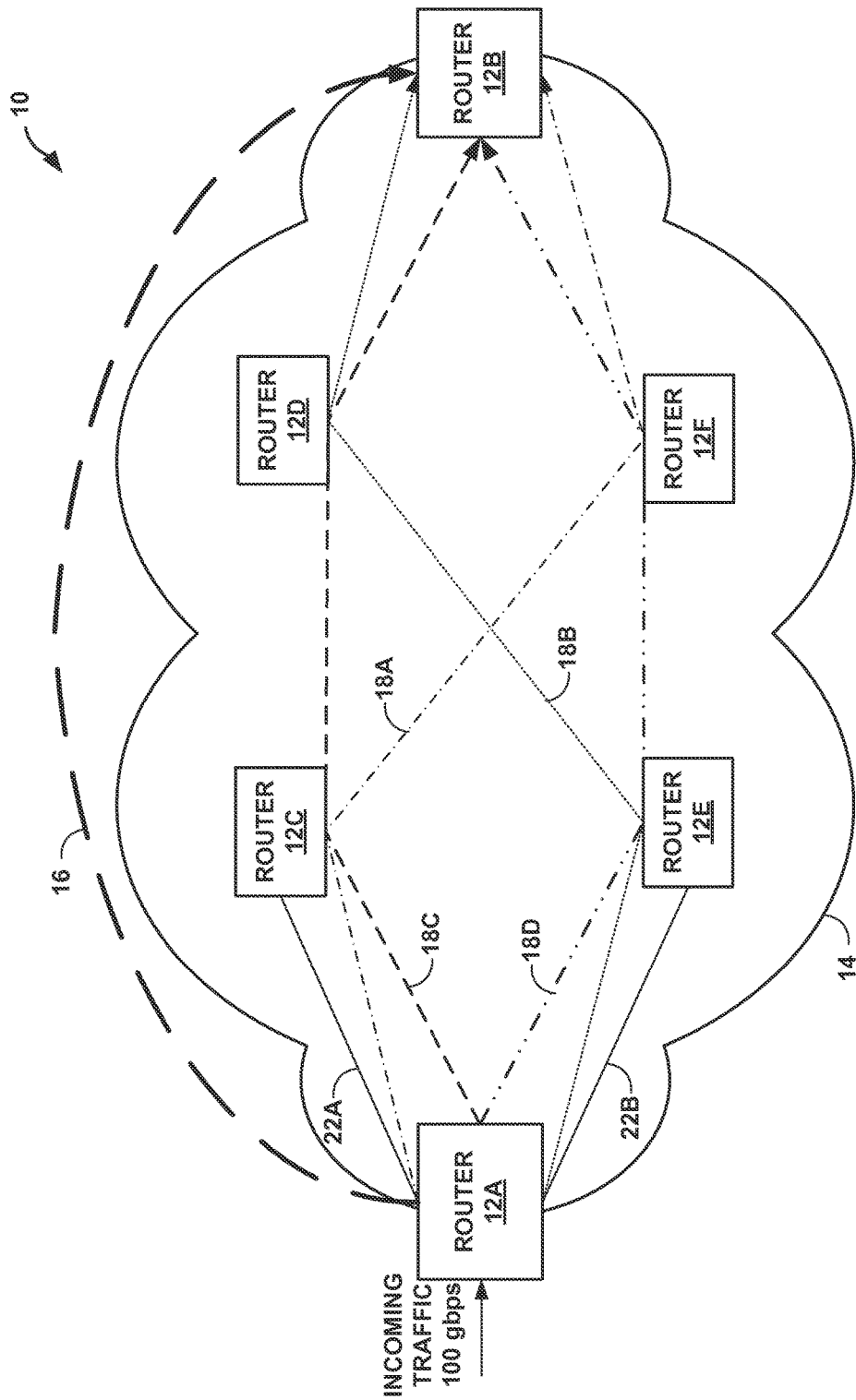
FIG. 1 is a block diagram illustrating an exemplary computer network having a load balancing TE LSP established over the network between an ingress router and an egress router.

The techniques of this disclosure include extensions to the RSVP-TE protocol that enable routers to establish a dynamic load balancing traffic-engineered (TE) multi-path LSP.

As described herein the load balancing multi-path LSP is a single LSP formed so as to contain multiple sub-paths from an ingress router to an egress router across which traffic is load balanced.

A multi-path LSP is configured at the ingress label-switched router (LSR) with various constraints typically associated with TE LSPs, such as destination LSR(s), bandwidth (on a per-class basis, if desired), link colors, Shared Risk Link Groups, etc. In addition, parameters specifically related to multi-path LSPs, such as how many (or the maximum number of) sub-paths to create, whether traffic should be split equally across sub-paths or not, etc. may also be specified.

The ingress LSR can use the configuration parameters to decide how many sub-paths to compute for this multi-path LSP and what paths they should take. Each sub-path will be selected to meet all the constraints of the multi-path LSP (except the bandwidth). The bandwidths (per-class, if applicable) of all the sub-paths should add up to the bandwidth of the multi-path LSP.

Having computed (or otherwise obtained) the paths of all the sub-paths, the ingress LSR then signals the multi-path LSP by signaling all the individual sub-paths across the network. If multiple sub-paths of the same multi-path LSP pass through an intermediate LSR, and the intermediate LSR has multiple downstream links for the various sub-paths, then the intermediate LSR has to load balance incoming traffic for the multi-path LSP across the three downstream links in proportion to the sum of the bandwidths of the sub-paths going to each downstream.

In one example aspect, the ingress LSR computes or otherwise obtains all sub-paths, and signals the multiple sub-paths. In another example aspect, at each hop along the LSP, the node (i.e., LSR) may bifurcate out the path or sub-path into multiple sub-paths, each traversing alternate routes to the destination of the LSP. In selecting the sub-paths while establishing the overall load balancing TE LSP, each node ensures each sub-path meets the traffic-engineering constraints of the traffic-engineered LSP, such as bandwidth, link colors, Shared Risk Link Group (SRLG), and the like. A given node may divide some constraints, such as bandwidth, across the sub-paths so as to meet an overall constraint for the LSP. A node that is a "merge point" for multiple sub-paths of the traffic-engineered LSP is responsible for requesting downstream path(s) that account for the total of the bandwidths required by each of the sub-paths that merge at that node. Further, each of the nodes in the load balancing TE LSP is configured to load balance traffic across the sub-paths of the load balancing TE LSP that emerge from the node.

After the load balancing TE LSP is established, a node along the TE LSP that receives network traffic destined (e.g., MPLS network traffic) for the egress of the TE LSP implements flow-level load balancing to allocate the traffic among the sub-paths downstream of the node. For example, the node may split the traffic using a flow-based hash function so as to allocate packets of the same packet flow to the same sub-path, yet provide a degree of load balancing across the sub-paths. If one packet flow begins using more than its share of bandwidth, the node may adjust a flow hash map to reallocate the packet flows across the sub-paths. In this manner, network traffic from the ingress to the egress is load balanced across sub-paths of the load balancing TE LSP such that all sub-paths of the TE LSP are roughly equally utilized.

ATE LSP that carries unicast traffic usually starts at one node (the ingress), and ends at another node (the egress). A load-balancing TE LSP can have multiple egresses, if these egress nodes are deemed equivalent for the traffic that the LSP carries. That is, there may be a number of equally valid egresses for a unicast LSP. A network device configured with the techniques described herein for load-balancing LSPs can compute multiple paths to the various egresses and balance the traffic across both sub-paths and egresses. Note that a given packet entering the load-balancing TE LSP at the ingress node traverses exactly one sub-path of the LSP, and thus arrives at exactly one egress node. This distinguishes load-balancing LSPs from multicast (point-to-multipoint) LSPs. In other embodiments, devices may be configured to form load-balancing point-to-multipoint (P2MP) LSPs. In these examples, traffic may be load balanced across an overall P2MP LSP.

FIG. 1 is a block diagram illustrating a system 10 that includes an exemplary computer network 14 having a load balancing multi-path LSP 16 established over the network 14 between an ingress router 12A and an egress router 12B, according to one example embodiment. Multi-path LSP 16 is a traffic-engineered tunnel. For example, multi-path LSP 16 may comprise a Resource Reservation Protocol with Traffic Engineering (RSVP-TE) Label Switched Path (LSP) tunnel. In the example of FIG. 1, routers 12A-12F ("routers 12") use a modified RSVP-TE protocol that has been extended to establish a load balanced TE multi-path LSP 16 ("multi-path LSP 16") that extends from ingress router 12A to egress router 12B. When routers 12 receive network traffic, multi-path LSP 16 is configured on routers 12 so as to allow routers 12 to load balance traffic across sub-paths 18A-18D ("sub-paths 18") of the multi-path LSP 16. In this way, multi-path LSP 16 may be viewed as a point-to-point tunnel between a single ingress and a single egress that is constructed to contain multiple, intermediate sub-paths used for actively load-balancing the MPLS traffic associated with the tunnel.

In some embodiments, multi-path LSP 16 may be formed as a point-to-multipoint (P2MP) LSP providing a P2MP tunnel from a single ingress to a plurality of destinations, where intermediate (P2MP) sub-paths may be used for actively load-balancing the MPLS traffic to any of the destinations. At any node of such a load balancing P2MP LSP, exactly one of a plurality of sub-paths is chosen for a given packet; however, if that sub-path has multiple downstream neighbors, the packet is replicated across those downstream neighbors. Extensions to RSVP-TE for the setup of P2MP LSPs in MPLS and Generalized MPLS (GMPLS) networks are described in "Extensions to RSVP-TE for Point to Multipoint TE LSPs," IETF, May 2005, hereby incorporated by reference. In another embodiment (not illustrated here), multi-path LSP 16 may be a unicast tunnel with multiple equally valid egress routers 12B. Packets are sent from ingress 12A to exactly one of these egress routers 12B via one of the sub-paths 18; the distinction between this and a load-balanced P2MP tunnel is that there is no replication of traffic in the case of a unicast tunnel with multiple egresses.

Network 14 may include a greater number of routers than are shown in FIG. 1. The ultimate sources of the network traffic being load balanced may comprise one or more devices and/or any public or private network or the Internet that provides traffic to ingress router 12A in network 14. The ultimate destinations of the network traffic being load balanced may comprise one or more destination devices and/or networks that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 14.

The extensions to RSVP-TE described herein enable ingress router 12A to calculate multiple sub-paths towards egress router(s) 12B, and to send multiple RSVP Path messages for the same multi-path LSP 16 to downstream routers along selected ones of the calculated sub-paths. Because the sub-paths are all part of the same overall LSP, i.e., multi-path LSP 16, routers 12 may be required to store less state in network 14 than if separate LSPs were constructed for each path between router 12A and router 12B.

In response to a network administrator initiating set-up of multi-path LSP 16 from router 12A to router 12B, ingress router 12A uses the extended RSVP-TE protocol to compute some or all of the available paths to egress router 12B that satisfy certain constraints on the tunnel imposed by the network administrator. Constraints imposed may include, for example, bandwidth, link color, Shared Risk Link Group (SRLG), and the like. For example, the network administrator may wish to configure an overall LSP that can handle 100 gigabits per second of network traffic. RSVP-TE uses constraint information about links within network 14, such as bandwidth availability, to compute the paths. For example, RSVP-TE may use bandwidth availability information accumulated by a link-state interior routing protocol, such as the Intermediate System-Intermediate System (ISIS) protocol or the Open Shortest Path First (OSPF) protocol. RSVP-TE as extended herein computes multiple paths for which certain constraints, including bandwidth, provide the requisite bandwidth availability in sum. This is described in further detail in the examples below. In another embodiment, an external entity such as a Path Computation Element may compute load-balancing sub-paths that RSVP-TE can then use to establish a load-balancing LSP.

After computing the multiple paths, RSVP-TE may select a subset or all of the computed paths on which to send a corresponding Path message for establishing sub-paths of the overall multi-path LSP 16. In contrast to conventional RSVP-TE, which selects a single path to the egress device for establishing an LSP, the RSVP-TE extended as described herein is configured to compute and select multiple sub-paths from the ingress to the egress.

Router 12A can send RSVP Path messages that contain information about one sub-path through network 14, or alternatively may send a Path message that can contain information about more than one such path.

The Path messages sent along different sub-paths can each include identifiers indicating that the bandwidth reservation is for the same overall multi-path LSP, so that receiving routers can easily determine that Path message may be one of a plurality of Path messages sent by the upstream device for the same overall multi-path LSP. Router 12A may compute other paths to egress 12B, but may select only the best paths that are able to accommodate the total bandwidth requested. In some embodiments, router 12A may be configured with an upper limit on the number of paths that can be computed and/or selected.

In some embodiments, router 12A may compute and select all of the sub-paths to be taken at each of downstream routers 12 within network 14 along the paths to router 12B, rather than each of routers 12C-12F performing the computations and selections on an individual basis. In these embodiments, router 12A may send all of the necessary Path messages to routers 12 within network 14 for reserving the bandwidth for the overall LSP multi-path LSP 16. In other embodiments, a network administrator may pre-compute all of the sub-paths to be taken by all of routers 12 within network 14, and may configure router 12A and/or each of routers 12 with this information. Alternatively, router 12A may instruct the other routers 12 as to which Path messages should be sent for reserving specific amounts of bandwidth on each of the selected sub-paths for the multi-path LSP 16. In this aspect, the other routers 12 may autonomously choose sub-paths.

In some embodiments, a router may be configured to allocate different labels for different sub-paths the overall LSP, rather than allocating the same label as done by router 12D. The allocated labels may be communicated in RSVP Resv messages that indicate an amount of reserved bandwidth, and that specify the Resv message as being associated with the overall multi-path LSP. In this way, the overall LSP for multi-path LSP 16 is traffic-engineered using RSVP-TE to include multiple sub-paths 18, in a manner that allows routers 12 to automatically load balance network traffic across the sub-paths 18 of multi-path LSP 16, i.e., an RSVP-TE LSP.

In accordance with the techniques described in this disclosure, after multi-path LSP 16 is established to extend from ingress router 12A to egress router 12B, router 12A dynamically balances the network traffic across links 22A and 22B, i.e., across sub-paths 18A and 18B of multi-path LSP 16. Router 12A initially receives a packet from another network device (not shown), which router 12A determines is intended for router 12B (e.g., having destination addresses that router 12B has advertised are reachable by router 12B). Router 12A may, for example, receive an IP packet to be admitted to the LSP. Router 12A determines one of links 22A, 22B through which to send the packet. That is, when encapsulating the IP packet and admitting the IP packet into the LSP, router 12A selects one of the set of sub-paths available for the encapsulated MPLS packet. After signaling of the sub-paths is complete, the choice of the traffic that is sent to along a given sub-path to a downstream router may be done randomly, or by computing a function (such as a hash) on the label stack, or on fields in the packet headers or contents beyond the label stack, such as an IP or Ethernet header.

In one example aspect, router 12A applies one or more hash functions to the packet. Router 12A may apply the hash function to the IP header of the packet, e.g., the 5-tuple {source IP address, destination IP address, source port number, destination port number, protocol}. Router 12A may maintain a set of bins of the hash function and maps each bin to one of links 22A, 22B. That is, when all or portions of the IP header are applied, the hash function maps packet flows to each of links 22A, 22B. By applying the hash function to the packet header, e.g., the 5-tuple, for a packet of a packet flow, router 12A may achieve load balancing of the packet flows across sub-paths 18 so that packets of the same packet flow traverse the same sub-path. In this manner, router 12A may ensure in-order delivery of the packets of the packet flow. If router 12A determines that the hash function is mapping packet flows to links 22A, 22B in a manner no longer consistent with the 60/40 bandwidth load balancing requirement, router 12A may dynamically adjust the manner in which the bins of the hash function are mapped to links 22A, 22B to maintain the appropriate load balancing of bandwidth for new packet flows.

In the case of an intermediate router along the LSP, such as router 12C, router 12C may apply the hash function to, for example, the outer MPLS header of the encapsulated packet in combination with the inner IP header of the encapsulated packet. That is, router 12C may do a limited inspection of the packet beneath the MPLS header to apply the hash function. This may allow packets of the same packet flow to be mapped along the same sub-path, even by intermediate devices along the LSP (i.e., devices other than the ingress or egress devices).

Figure 2:
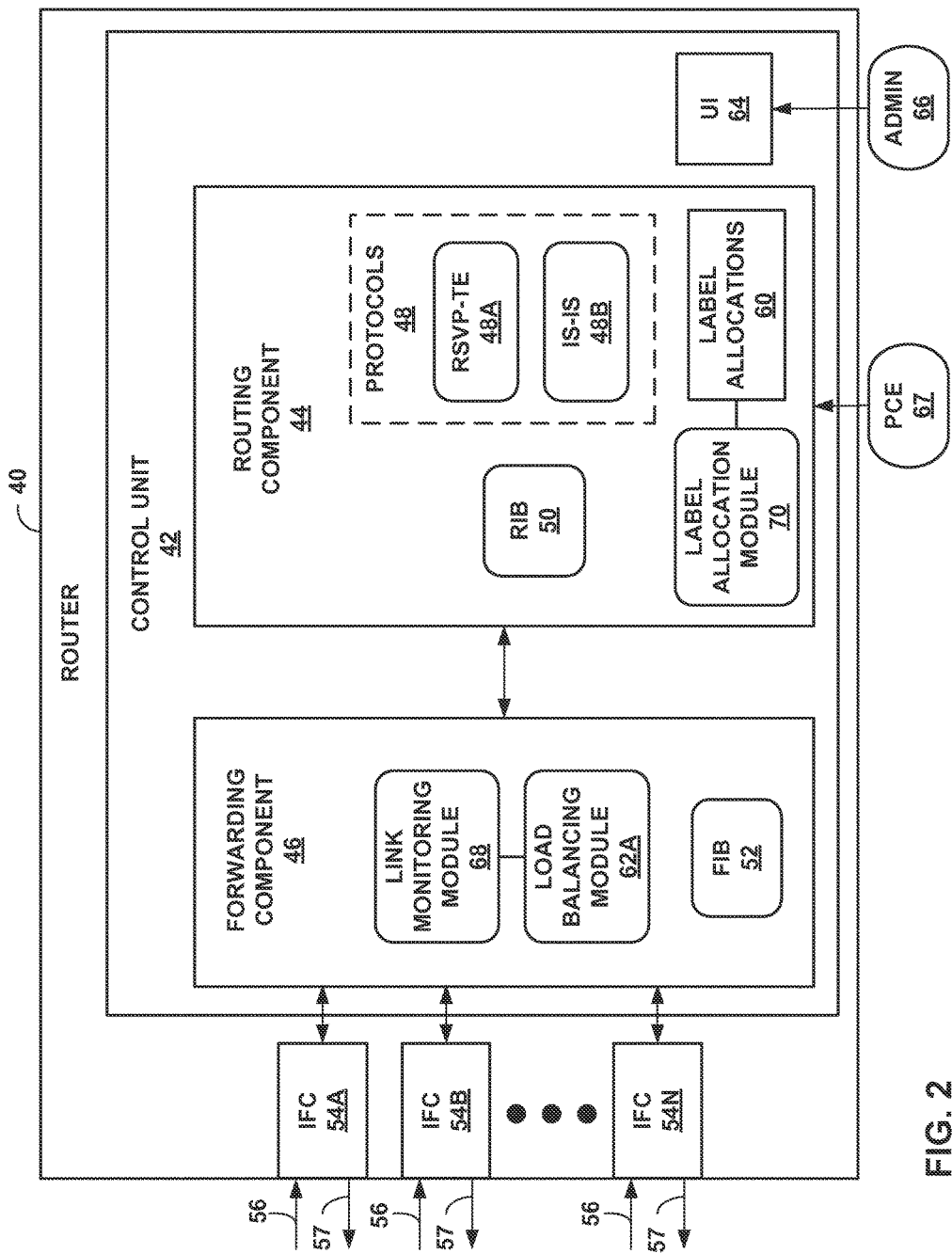
FIG. 2 is a block diagram illustrating an exemplary router capable of supporting RSVP-TE with load balancing extensions in accordance with the techniques described herein.

FIG. 2 is a block diagram illustrating an exemplary router 40 capable of supporting RSVP-TE with load balancing extensions in accordance with the techniques described herein. Router 40 may correspond to any of routers 12 of FIG. 1. Router 40 includes interface cards 54A-54N ("IFCs 54") for receiving packets via input links 56A-56N ("input links 56") and sending packets via output links 57A-57N ("output links 57"). IFCs 54 are interconnected by a high-speed switch (not shown) and links 56, 57. In one example, switch 40 comprises switch fabric, switchgear, a configurable network switch or hub, and the like. Links 56, 57 comprise any form of communication path, such as electrical paths within an integrated circuit, external data busses, optical links, network connections, wireless connections, or other type of communication path. IFCs 54 are coupled to input links 56 and output links 57 via a number of interface ports (not shown).

When router 40 receives a packet via one of input links 56, control unit 42 determines via which of output links 57 to send the packet. Control unit 42 includes routing component 44 and forwarding component 46. Routing component 44 determines one or more routes through a network, e.g., through interconnected devices such as other routers. Control unit 42 provides an operating environment for protocols 48, which are typically implemented as executable software instructions. As illustrated, protocols 48 include RSVP-TE 48A and intermediate system to intermediate system (IS-IS) 48B. Router 40 uses RSVP-TE 48A to set up LSPs. As described herein, RSVP-TE 48A is programmatically extended to allow for establishment of LSPs that include a plurality of sub-paths on which traffic is load balanced between the ingress router and the egress router of the LSPs. Protocols 46 may include other routing protocols in addition to or instead of RSVP-TE 48A and IS-IS 46B, such as other Multi-protocol Label Switching (MPLS) protocols including LDP; or routing protocols, such as Internet Protocol (IP), the open shortest path first (OSPF), routing information protocol (RIP), border gateway protocol (BGP), interior routing protocols, or other network protocols.

By executing the routing protocols, routing component 44 identifies existing routes through the network and determines new routes through the network. Routing component 44 stores routing information in a routing information base (RIB) 50 that includes, for example, known routes through the network. Forwarding component 46 stores forwarding information base (FIB) 52 that includes destinations of output links 57. FIB 52 may be generated in accordance with RIB 50.

A system administrator ("ADMIN 66") may provide configuration information to router 40 via user interface 64 ("UI 64") included within control unit 42. For example, the system administrator may configure router 40 or install software to extend RSVP-TE 48A as described herein. As another example, the system administrator may configure RSVP-TE 48A to traffic-engineer an overall LSP from an ingress router to an egress router. As a further example, a path computation element (PCE) 67 may alternatively or additionally provide configuration information to router 40, e.g., may compute the sub-paths and provide them to router 40.

The extensions to RSVP-TE 48A enable router 40 to calculate multiple sub-paths towards an egress router of an overall RSVP-TE LSP, and to send multiple RSVP Path messages for the overall RSVP-TE LSP to downstream routers along selected ones of the calculated sub-paths. Because the sub-paths are all part of the same overall LSP, router 40 may be required to store less state versus networks that maintain separate LSPs when implementing load balancing. The extensions to RSVP-TE 48A allow RSVP-TE 48A to configure the forwarding component 46, e.g., load balancing module 62A and link monitoring module 68, to reflect the load-balancing requirements for the overall LSP.

In response to the network administrator initiating set-up of an overall RSVP-TE LSP, router 40 uses the extended RSVP-TE 48A to compute some or all of the available paths to the egress router that satisfy certain constraints on the tunnel imposed by the network administrator. Constraints imposed may include, for example, bandwidth, link color, Shared Risk Link Group (SRLG), and the like. For example, the network administrator may wish to configure an overall LSP that can handle 100 gigabits per second of network traffic. RSVP-TE 48A uses constraint information about links within network 14, such as bandwidth availability, to compute the paths. For example, RSVP-TE 48A may use bandwidth availability information accumulated by a link-state interior routing protocol, such as the Intermediate System-Intermediate System (ISIS) protocol or the Open Shortest Path First (OSPF) protocol. RSVP-TE computes multiple paths for which certain constraints, including bandwidth, provide the requisite bandwidth availability in sum.

RSVP-TE 48A generates and sends Path messages for establishing load balancing LSPs (including sub-paths) as described above with reference to FIG. 1. Upon router 40 receiving a Path message from a neighboring router, label allocation module 70 allocates MPLS labels used for establishing the LSPs. Router 40 distributes the labels and reserves bandwidth on links using RSVP-TE 48A to generate Resv messages as described above. Routing component 44 maintains label allocations 60 which specify how label allocation module 70 has allocated the MPLS labels. For example, label allocations 60 may indicate label bindings to particular forwarding equivalence classes (FECs) associated with LSPs within network 14. Label allocation module 70 may then update FIB 52 of forwarding component 46 with the labels to be applied when forwarding packets on LSPs.

RSVP-TE 48A may also be extended to recognize modified Path messages and modified Resv messages sent for establishing a load balancing LSP. For example, RSVP-TE 48A may be extended to recognize a received Path message or Resv message as one of a set of messages that collectively are used in the network to establish a "load balancing" TE LSP based on a indicator (e.g., a special field or bit) set in the Path message or Resv message, for example. This special field or bit indicates to the receiving router that other messages received that identify the same LSP are not in error but instead are to be associated with one another as establishing sub-paths for an overall LSP that must satisfy overall constraints, thereby allowing the receiving router to determine whether it is a merge-point or a branch-point for intermediate sub-paths of the load balancing LSP. Router 40 may utilize some of the same mechanisms for establishing load balancing LSPs as are used in establishing P2MP RSVP LSPs. For example, router 40 may advertise its capability in using the extensions to RSVP-TE described herein, to other routers, such as by using RSVP-TE Hello messages. Further details of these mechanisms are described in application Ser. No. 11/508,096, entitled "RESOURCE RESERVATION PROTOCOL WITH TRAFFIC ENGINEERING POINT TO MULTI-POINT LABEL SWITCHED PATH HIERARCHY," filed on Aug. 22, 2006, the entire contents of which are incorporated herein by reference.

When router 40 receives packets of a new packet flow, load balancing module 62A of forwarding component 46 identifies one of output links 57 through which to forward packets of the new packet flow, and also identifies an MPLS label to apply to the packets of the packet flow. After load balancing module 62A has selected one of output links 57 and an MPLS label for a packet flow, forwarding component 46 forwards all packets of the packet flow along the selected one of output links 57 using the selected MPLS label. Load balancing module 62A may refer to link monitoring module 68 to determine whether network traffic is appropriately allocated across output links 57 before assigning a new packet flow to the one of output links 57.

Where the packet flows are assigned to be forwarded on an RSVP-TE LSP, link monitoring module 68 determines whether output links 57 are loaded with the proper bandwidth allocation, e.g., as configured by RSVP-TE 48A during establishment of the overall RSVP-TE LSP. In one example, link monitoring module 68 determines bandwidth utilization for each of output links 57. In another example, link monitoring module 68 determines whether a number of packet flows assigned to a particular one of output links 57 has exceeded a threshold. In another example, link monitoring module 68 determines a number of packets per second being sent over each of output links 57. In another example, link monitoring module 68 determines a number of gigabits per second being sent over each of output links 57. In other examples, link monitoring module 68 may utilize a combination of the above-described techniques, or other techniques for determining link congestion. In any case, link monitoring module 68 determines whether usage of output links 57 is consistent with the requirements specified by RSVP-TE 48A for the LSP sub-paths running on the output links 57.

Link monitoring module 68 may also determine when one of the links fails. Link monitoring module 68 communicates with load balancing module 62A to cause load balancing module 62A to update a hash map such that traffic is diverted from the failed link onto other remaining links over which the traffic for the overall RSVP-TE LSP is being load balanced. Load-balancing LSPs may therefore provide improved network resilience, without requiring dedicated links just for failure cases.

Figure 3:
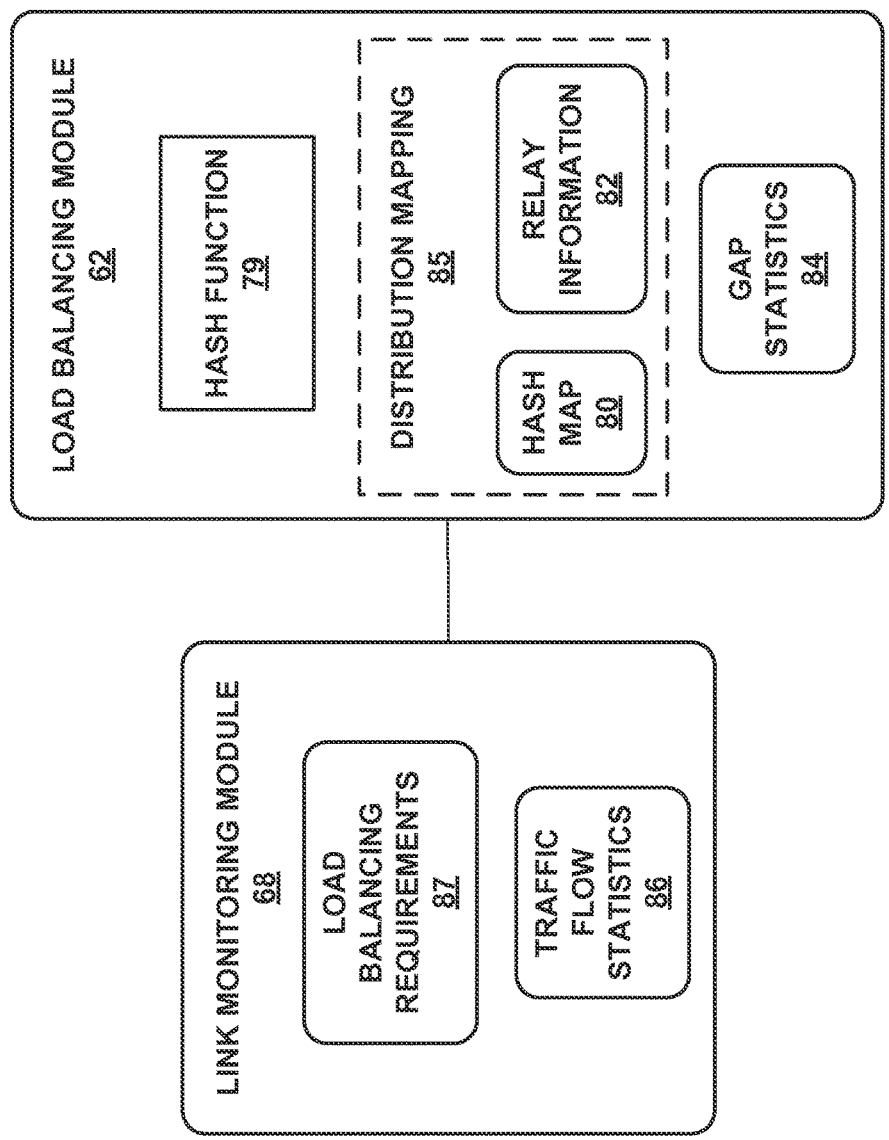
FIG. 3 is a block diagram illustrating an example of a load balancing module and link monitoring module of FIG. 2 in greater detail.
Figure 4:
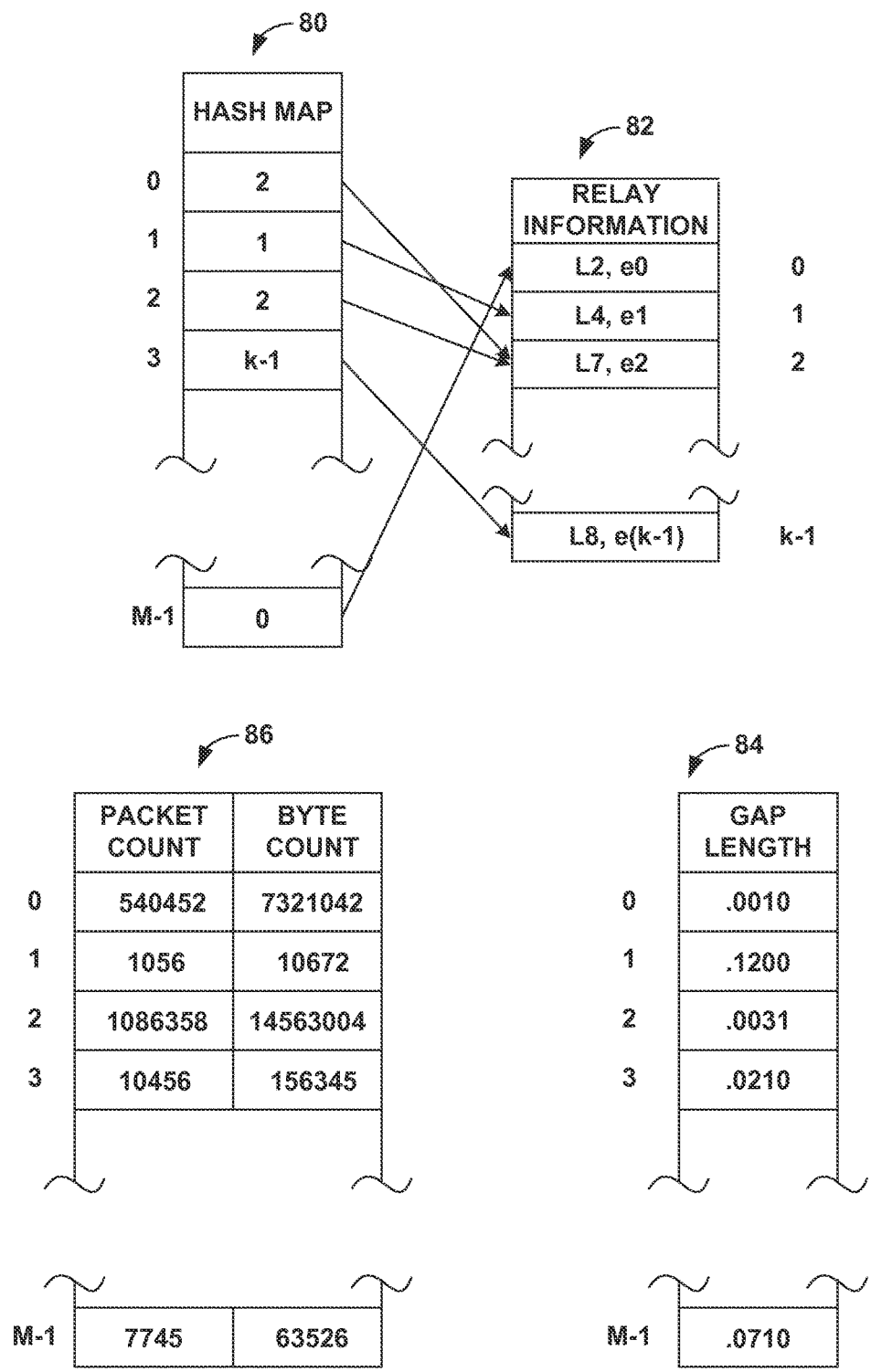
FIG. 4 is a block diagram illustrating exemplary data structures maintained by a load balancing module and a link monitoring module of a router to distribute traffic across sub-paths of an overall RSVP-TE LSP.

As described in greater detail with respect to FIGS. 3 and 4, load balancing module 62A balances packet flows across output links 57 by selecting one of output links 57 to which to assign a new packet flow. In the event router 40 is an ingress to the LSP, upon receiving a new packet flow, load balancing module 62A selects one of output links 57 by applying a hash function to a 5-tuple of a packet header. Load balancing module 62A queries link monitoring module 68 to determine whether the bandwidth utilization of packet flows currently assigned to output links 57 are in keeping with the bandwidth load balancing requirements. If so, load balancing module 62A assigns the new packet flow to the selected one of output links 57. In one example, when link monitoring module 68 determines that the links associated with an overall LSP are not appropriately balanced, load balancing module 62A may select a different link to assign to the new packet flow, and may revise a hash map that maps bins of a hash function to output links 57 to maintain the appropriate load balancing of bandwidth.

In the event router 40 is an intermediate router along the LSP and operates as a branch point for multiple sub-paths of the LSP, router 40 similarly load balances MPLS packets across the sub-paths. In this case, router 40 may apply a hash function to a defined set of data words that follow the label stack of the packet. For example, router 40 may apply a hash function to data words that would correspond to the IP header in the event the MPLS packets encapsulate IP traffic. In this case traffic of the same packet flows would likely be mapped to the same sub-paths as such data words would likely not vary even if the payload of the MPLS packets did not carry IP traffic. In some cases, router 40 may apply signatures and deep packet inspection so as to identify the encapsulated traffic and select appropriate inputs for the hash function from the traffic (e.g., ATM headers, Ethernet headers, IP headers) so as to further assure that packets of the same packet flow are assigned to the same sub-path of the load balancing LSP. In some aspects, forwarding component 46 may include a flow table and classifier (not shown) that classifies inbound packets received on inbound links 56 to packet flows referenced by a flow table (not shown), as described below with respect to FIG. 10. A "packet flow," as used herein, refers a set of packet header field values and/or packet data that cause any packet containing such values to be assigned to a particular sub-path in an overall LSP toward that packet's destination. In addition, a packet flow may be the minimum granularity at which muter 40 maintains state in a flow table for forwarding network packets that are classified to a packet flow referenced in the flow table. The classifier may classify packets to a packet flow referenced in the flow table by, for example, their respective <source IP address, destination IP address, protocol identifier> 3-tuple value or by their respective <source IP address, destination IP address, source port, destination port, protocol identifier> 5-tuple value.

The architecture of router 40 illustrated in FIG. 2 is shown for exemplary purposes only. This disclosure is not limited to this architecture. In other embodiments, router 40 may be configured in a variety of ways. In one embodiment, for example, some of the functionally of control unit 42 may be distributed within IFCs 54.

Control unit 42 may be implemented solely in software, or hardware, or may be implemented as a combination of software, hardware, or firmware. For example, control unit 42 may include one or more processors which execute program code in the form of software instructions. In that case, the various software modules of control unit 42 may comprise executable instructions stored on a computer-readable storage medium, such as computer memory or hard disk.

FIG. 3 is a block diagram illustrating an example of load balancing module 62A and link monitoring module 68 of FIG. 2 in greater detail. Load balancing module 62A balances packet flows across output links 57 in accordance with bandwidth reserved for any sub-paths that branch from the router. To perform load balancing, load balancing module 62A selects one of output links 57 of the sub-paths by applying hash function 79 to a packet of a new packet flow. For example, load balancing module 62A applies hash function 79 to a packet header of the packet, such as the 5-tuple (source IP address, destination IP address, source port number, destination port number, protocol). In the event the router is an intermediate router along the load balancing LSP, load balancing module 62A may apply hash function 79 to an MPLS label or to certain data words that follow the end of the MPLS label stack of the packet.

Load balancing module 62A determines, when identifying a link for a new packet flow, whether the link identified by hash function 79 is suitable by querying link monitoring module 68 with an identification of the link. For existing packet flows, load balancing module 62A may, in some cases, apply the same hash function 79 to all packets of the packet flow. Alternatively or additionally, to ensure in-order delivery of packets of the packet flow corresponding to the received packet, load balancing module 62A may store an identification of the selected link for the packet flow upon receiving a new packet flow. For example, load balancing module 62A may inspect the packet header to determine whether the packet is a SYN packet. When the packet is a SYN packet, load balancing module 64 determines that the packet corresponds to a new packet flow. When the packet is not a SYN packet, load balancing module 64 forwards the packet to the selected link according to the stored identification.

When load balancing module 62A associates a packet with a particular packet flow, load balancing module 62A may maintain a distribution mapping 85 that associates the hash value of the inbound packet with a next hop and corresponding MPLS label. Distribution mapping 85 may include a hash map 80 that associates the possible hash values with a set of pointers, and relay information 82 that defines a set of forwarding elements and is addressable via the set of pointers. For distributing packets across sub-paths 18, the forwarding elements may define a set of output interfaces and corresponding MPLS labels for the respective next hops along sub-paths 18. In this manner, distribution mapping 85 maps the hash values to MPLS labels and next hops and, more specifically, to output ports of particular sub-paths 18.

Link monitoring module 68 maintains traffic flow statistics 86, which track the amount of traffic associated with each of the hash values. Link monitoring module 68 also maintains load balancing requirements 87 based on network administrator configuration and/or load balancing information received by extended RSVP-TE 48A, such as by Path and Resv messages received. Traffic flow statistics 86 may track traffic flows using a counter for each of the possible hash values. The counter may track the number of packets received for each hash value, the number of bytes received for each hash value, the rate of packets or bytes received, or the like. Traffic flow statistics 86 may further track the amount of traffic corresponding to each of the possible next hops. In this manner, traffic flow statistics 86 may track the amount traffic flow of each of sub-paths 18. Link monitoring module 68 compares traffic flow statistics 86 to load balancing requirements 87 and may update distribution mapping 85 to re-distribute the traffic across sub-paths 18 in accordance with load balancing requirements 87.

Load balancing module 62A may further maintain gap statistics 84. Gap statistics 84 may track gaps within hash values using timestamps that indicate the time at which the last packet of a particular hash value was received, counters tracking the amount of time elapsed since the last packet of a particular hash value was received, or the like. Load balancing module 62A may use gap statistics 84 to determine an appropriate time at which to update the distribution of traffic across parallel data paths while maintaining in-sequence delivery of packets. More specifically, load balancing module 62A uses gap statistics 84 to determine the appropriate time to update the mappings of hash values to next hops.

Load balancing module 62A and link monitoring module 68 may arrange distribution mapping 85, hash map 80, relay information 82, traffic flow statistics 86, and gap statistics 84 in the form of a variety of data structures, such as a number of tables, link lists, radix trees, databases, flat files, or other data structures. Furthermore, load balancing module 62A and link monitoring module 68 may store the data structures on one or more computer-readable media, such as a magnetic medium, optical medium, non-volatile random access memory (NVRAM), dynamic random access memory (DRAM), FLASH memory, or the like.

FIG. 4 is a block diagram illustrating exemplary data structures maintained by load balancing module 62A and link monitoring module 68 of router 40 to distribute traffic across sub-paths of an overall RSVP-TE LSP. In the example, hash map 80 comprises a table in which each row represents an association of a hash value to relay information. For each association, hash map 80 includes, for each of the M possible hash values, a pointer to relay information 82.

Relay information 82, as illustrated for exemplary purposes, comprises a table in which each row represents next hops for an associated data path. Relay information 82 includes next hops for each of the possible data paths. Relay information 82 includes k sets of next hops. Ideally, the size (Ml) of hash map 80 is relatively large compared with the size (k) of relay information 82. For example, M may equal 128 and k may equal 8. In this manner, load balancing module 62A may map more than one hash value to each data path.

In the example of FIG. 4, pointer values stored within the elements of hash map 80 map to indices into relay information 82, as indicated by dashed arrows. For example, the element of hash map 80 corresponding to a hash value 0 stores index 2, which maps hash value 0 to the MPLS label L7 and next hop e2, as stored by relay information 82.

Traffic flow statistics 86 are illustrated as a table in which each row represents traffic flow information for a particular hash value. For each hash value, traffic flow statistics 86 includes the packet count for the hash value and the byte count for the hash value. Traffic flow statistics 86 may maintain information for each of the M possible hash values. Link monitoring module 68 may use traffic flow statistics 86 to maintain the required distribution of packet flows of each hash value across the possible data paths. For example, the traffic flow statistics collected may indicate that the amount of traffic traversing the data path corresponding to next hop e2 is greater than a threshold amount from the desired load balancing requirements specified in load balancing requirements 87.

The packet flows corresponding to the hash value 0 and hash value 2 are mapped to MPLS label L7 and next hop e2. If deemed necessary, in order to decrease the volume of traffic traversing next hop e2, link monitoring module 68 may update the mapping of hash values to particular next hops and labels, e.g., hash value 0 or 2, to a next hop and label associated with a different sub-path along the overall RSVP-TE LSP, such as next hop e1 and label L4.

Gap statistics 84 are illustrated as a table in which each row represents the amount of time elapsed since last receiving a packet with a particular hash value. Each row includes a timing mechanism, such as a timestamp or a counter. Gap statistics 84 may track the amount of time elapsed since receiving a packet, i.e., the gap length, of a particular hash value for each of the M possible hash values. Load balancing module 62A may use gap statistics 84 to maintain in-sequence delivery while updating the mapping of hash values to next hop of data paths. For example, load balancing module 62A may compare the amount of time elapsed since receiving a packet with a particular hash value, i.e., the gap length of the hash value, with a defined threshold gap. Load balancing module 62A may wait until the gap length exceeds the defined threshold gap before updating the mapping.

The data of FIG. 4 is illustrated for exemplary purposes, and may be readily varied. For example, traffic flow statistics 86 may only include packet counts or byte counts, but not both. Further, traffic flow statistics 86 may include counter data for each of the data paths. Relay information 38 may include port information, output interface information, or the like.

Figure 5:
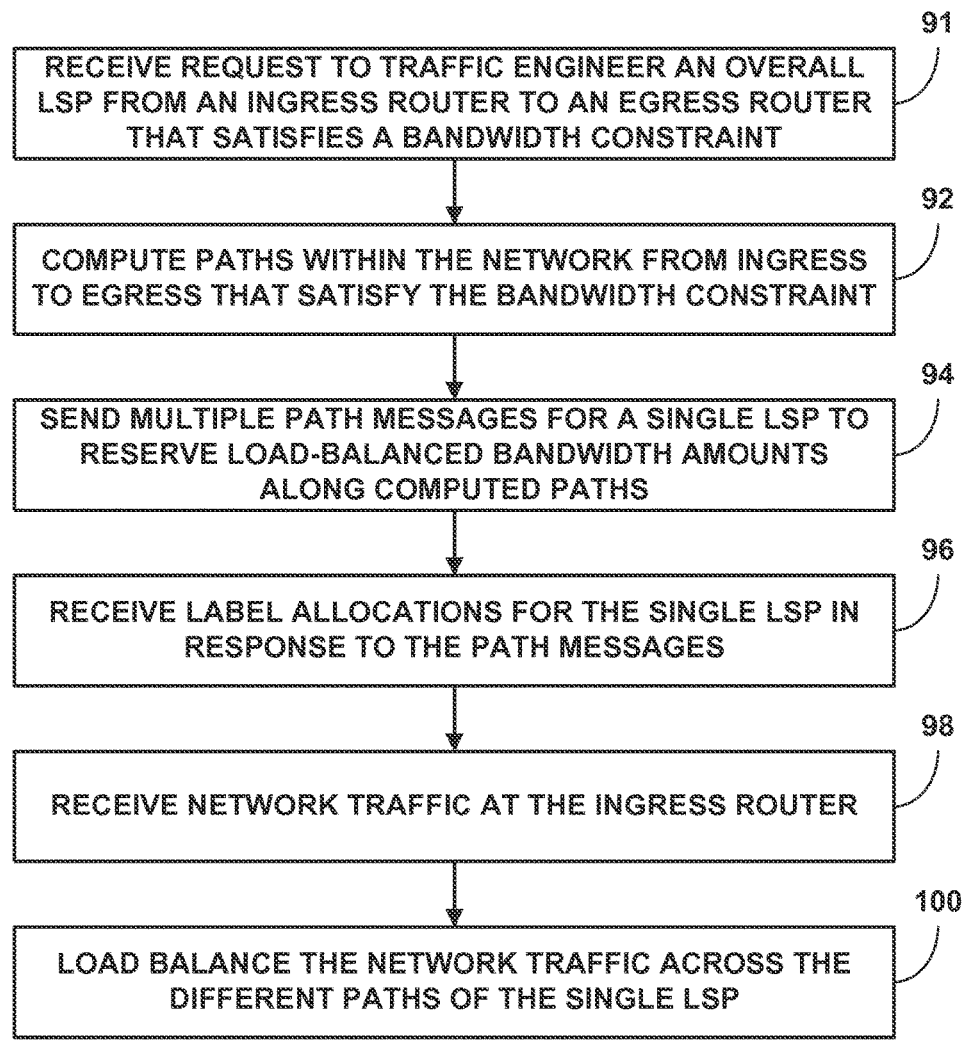
FIG. 5 is a flowchart illustrating exemplary operation of a router in establishing an overall RSVP-TE LSP that includes a plurality of sub-paths from the ingress router to the egress router.

FIG. 5 is a flowchart illustrating exemplary operation of router 40 in establishing an overall RSVP-TE multi-path LSP that includes a plurality of sub-paths from the ingress router to the egress router. FIG. 5 will be explained with reference to routers 12 of FIG. 1 and router 40 of FIG. 2. Router 12A may receive a request to traffic-engineer an overall RSVP-TE LSP (e.g., multi-path LSP 16 of FIG. 1) that satisfies certain constraints. For example, a network administrator may configure router 12A with the request (91). Constraints imposed may include, for example, bandwidth, link color, Shared Risk Link Group (SRLG), and the like. For example, the network administrator may wish to configure an overall LSP that can handle 100 gigabits per second of network traffic. RSVP-TE 48A uses constraint information about links within network 14, such as bandwidth availability, to compute the paths that satisfy the constraints (92). For example, RSVP-TE 48A may use bandwidth availability information accumulated by a link-state interior routing protocol, such as the Intermediate System-Intermediate System (ISIS) 48B or the Open Shortest Path First (OSPF) protocol. RSVP-TE 48A computes multiple paths for which certain constraints, including bandwidth, provide the requisite bandwidth availability in sum. RSVP-TE 48A may be configured with an upper limit on how many paths can be computed and/or selected.

For each of the selected sub-paths, RSVP-TE 48A generates and sends a Path message associated with the same overall RSVP-TE LSP (94). Router 12A may then receive label advertisements with RSVP-TE 48A via Resv messages in response to the Path messages (96). Router 12A may update relay information 82 to reflect the how the received labels map to next hops. In some cases, such as where router 12A may be an intermediate router along the overall LSP, router 12A may also allocate labels, store the label allocations, distribute the labels, and reserve bandwidth on links using RSVP-TE 48A to generate Resv messages as described above.

Upon receiving network traffic that router 12A determines is destined for egress router 12B (98), load balancing module 62A of router 12A determines one of links 22A, 22B through which to send the packet by applying hash function 79 to the packet header, e.g., the 5-tuple {source IP address, destination IP address, source port number, destination port number, protocol}. Hash function 79 outputs a value, which load balancing module 62A maps to relay information 82 based on hash map 80. Relay information 82 returns an MPLS label to apply to the packets of the packet flow for the network traffic, and a next hop for forwarding the labeled packets.

In this manner, router 12A load balances the packet flows across sub-paths 18A, 18B (100). For example, distribution mapping 85 may map different packet flows to sub-paths 18A or 18B according to the load balancing requirements 87. Link monitoring module 68 may update the hash map 80 if traffic flow statistics 86 indicate that the actual packet flows being mapped are not meeting the load balancing requirements 87 that were set when the overall RSVP-TE LSP was established using the extended RSVP-TE LSP.

Figure 6:
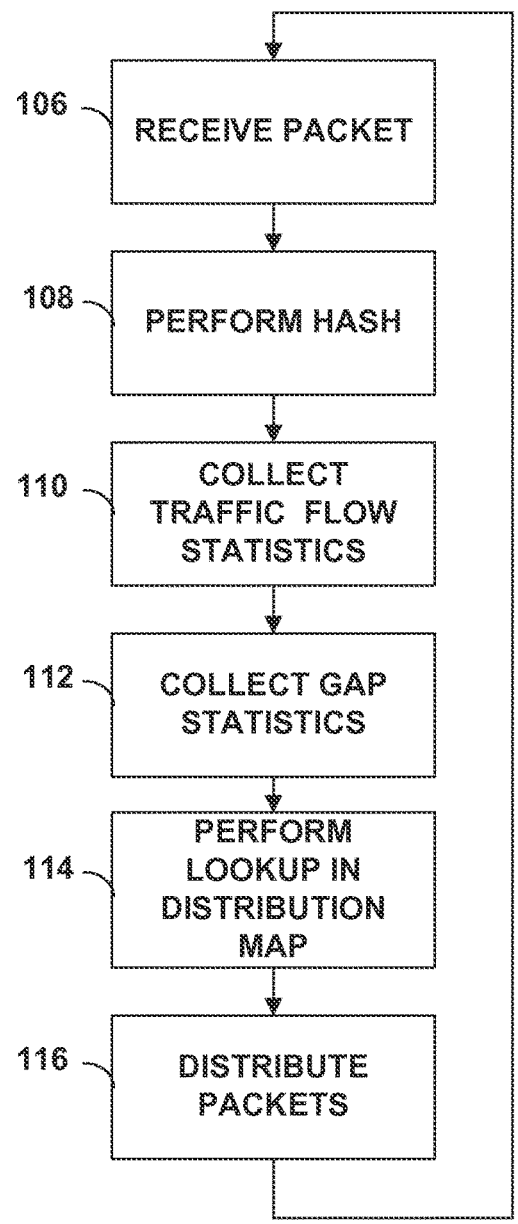
FIG. 6 is a flowchart illustrating an example mode of operation of a router when receiving packets and load balancing the packets across multiple sub-paths of a single overall LSP in accordance with the principles of the invention.

FIG. 6 is a flowchart illustrating an example mode of operation of router 40 when receiving packets and load balancing the packets across multiple sub-paths of a single overall LSP in accordance with the principles of the invention. Initially, router 40 receives an inbound packet from the network via a network link (106). Next, router 40 performs a hash on a key of the inbound packet or, in the event router 40 is an intermediate router along the LSP, on a header extracted from the payload of the MPLS packet (108). The key may include routing information such as the source IP address, destination IP address, protocol type, the source and destination port numbers, the class of service (CoS), the type of service (ToS), as well as any other field in the routing information of the packet that remains constant for any one flow of data from source to destination. The amount of routing information included in the key depends on the desired granularity of the hash. For instance, the more routing information included in the hash the more possible hash values, i.e., the more granular the hash.

Router 40 may further collect traffic flow statistics 86 for each of the hash values (110). Router 40 may collect traffic flow statistics 86 with a set of counters. Router 40 associates at least one counter with each of the hash values. The counters may count the number of packets corresponding to each hash value, the number of bytes corresponding to each hash value, or the like. Further, router 40 may associate at least one counter with each of the sets of next hop of relay information 82. For example, router 40 may collect traffic flow statistics for each hash value with a counter to count the number of packets and a counter to count the number of bytes corresponding to each hash value. Router 40 may concurrently collect traffic flow statistics for each set of next hops, which may correspond to more than one hash value. Router 40 may use traffic flow statistics 86 to update the mapping of hash map 80 in order to load-balance traffic across multiple sub-paths of a single overall LSP consistent with load balancing requirements 87.

Router 40 may further track gap statistics for each hash value (112). Router 40 may use gap statistics 84 to prevent out of sequence delivery of packets while balancing traffic. Router 40 may track gap statistics 84 by associating a timestamp with each of the hash values. The timestamp may indicate the time at which the last packet with the particular hash value was received. For example, upon identifying the hash value of the packet, router 40 may set a timestamp associated with the hash value. Alternatively, router 40 may track gap statistics 84 with a set of counters. Router 40 may associate at least one counter with each of the hash values. Whenever router 40 receives a packet, the counter associated with the hash value of the packet may be set to a fixed value, and periodically incremented by a specified increment value. For example, when router 40 receives a packet, the counter associated with the hash value of the packet may be set to 0 and the increment value may be set to 1 millisecond. In this manner, the counter may track the amount of time that has elapsed since a packet with the particular hash value was received.

Router 40 performs a look up in distribution mapping 85 to map the calculated hash value for the packet to one of a set of next hops and MPLS labels in accordance with relay information 82 (114). Router 40 applies the MPLS label and forwards the packet to a corresponding output interface for the identified next hop (116).

Figure 7:
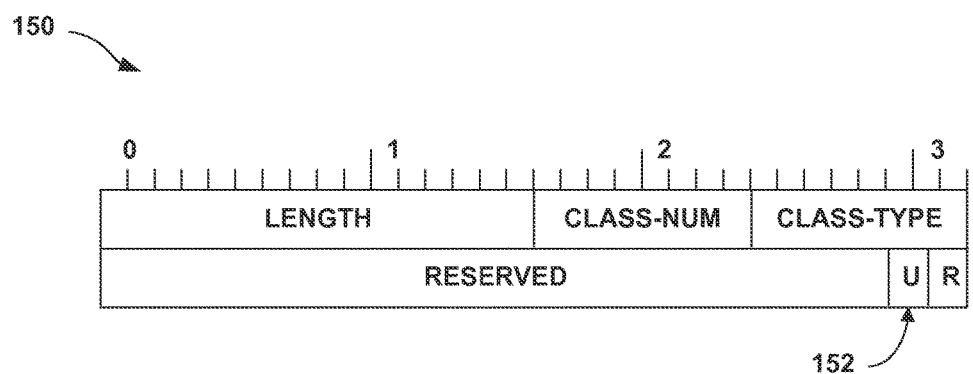
FIG. 7 illustrates an exemplary RSVP-TE Capability object used to indicate whether a router supports load balancing RSVP-TE LSPs.

FIG. 7 illustrates an exemplary RSVP-TE Capability object 150 used to indicate whether a router supports dynamic load-balancing RSVP-TE LSPs. In some embodiments, capability object 150 may be carried within RSVP-TE Hello messages sent from a router to neighboring routers in a network and indicates a set of capabilities supported by the router. In other embodiments, Capability object 150 may be carried within RSVP-TE Path messages or RSVP-TE Resv messages to indicate that the Path messages or Resv messages are to be used for establishing a dynamic load balancing RSVP-TE LSP. Capability object 150 includes a length field, a class-number field, a class-type field (set equal to class-type 1), a reserved field, and an R flag that indicates support for RecoveryPath refresh. In accordance with this disclosure, a new flag, U flag 152, may be defined in the Capability object 150 to indicate that a router supports dynamic load-balancing RSVP-TE LSPs and/or that the message that contains the Capability object 150 is to be used for establishing a dynamic load balancing RSVP-TE LSP.

The usage of RSVP-TE Hello messages for exchanging dynamic load-balancing RSVP-TE LSP capability implies that a router may exchange RSVP-TE Hellos with a neighboring router before sending or receiving any other RSVP-TE messages with that neighboring router. In some cases, a router may not send Path messages for establishing an overall load-balancing RSVP-TE LSP to routers along the overall LSP unless the sending router knows that at least some of the other routers support load-balancing RSVP-TE LSPs. U flag 52 within Capability object 50 provides a mechanism for routers to advertise dynamic load-balancing RSVP-TE LSP capability to neighboring routers in a network.

The dynamic load-balancing RSVP-TE LSP capable U flag 52 comprises 1 bit. When U flag 52 is set (U=1), the router is capable of both sending modified Path messages and modified Resv messages and receiving modified Path messages and modified Resv messages. When U flag 52 is not set (U=0), the router is not capable of either distributing or receiving modified Path or Resv messages. The reserved bits are be set to zero on transmission and ignored on receipt.

Figure 8:
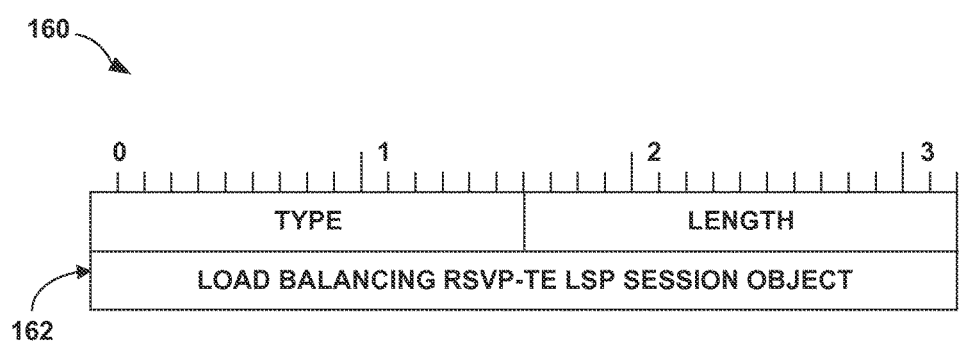
FIG. 8 illustrates an exemplary type-length-value (TLV) of an RSVP-TE object that signals a Tunnel Identifier.

FIG. 8 illustrates an exemplary type-length-value (TLV) of an RSVP-TE object that signals a Tunnel Identifier. A router may transmit an MPLS packet to a router along the overall load-balancing LSP by encapsulating the MPLS packet in an IP tunnel or a MPLS tunnel. In this case, the receiving router may determine that the MPLS packet is associated with a load-balancing LSP based on the tunnel on which the router receives the packet. The TLV illustrated in FIG. 8 provides a mechanism for the sending router to inform the receiving router that the sending router will use a particular tunnel for transmitting MPLS packets for load-balancing RSVP-TE LSPs.

When using RSVP-TE for establishing load-balancing RSVP-TE LSPs, the IF_ID RSVP_HOP object may be used to signal the Tunnel Identifier. If the sending router uses an IP or MPLS tunnel to transmit MPLS packets for a load-balancing RSVP-TE LSP to the receiving router, the sending router includes the IF_ID RSVP_HOP object in Path messages and Resv messages, possibly in addition to the RSVP-TE Capability object 150 of FIG. 7. The TLV value acts as the Tunnel Identifier.

FIG. 8 illustrates an exemplary Load Balancing RSVP-TE LSP TLV 160 in the IF_ID RSVP_HOP object. Load Balancing RSVP-TE LSP TLV 60 includes a type field, a length field, and a value field 162 that acts as the Tunnel Identifier. In this case, value field 162 comprises the Load Balancing RSVP-TE Session Object and 1optionally the Sender Template Object. The TLV value field 162 identifies the load-balancing RSVP-TE LSP.

Figure 9A:
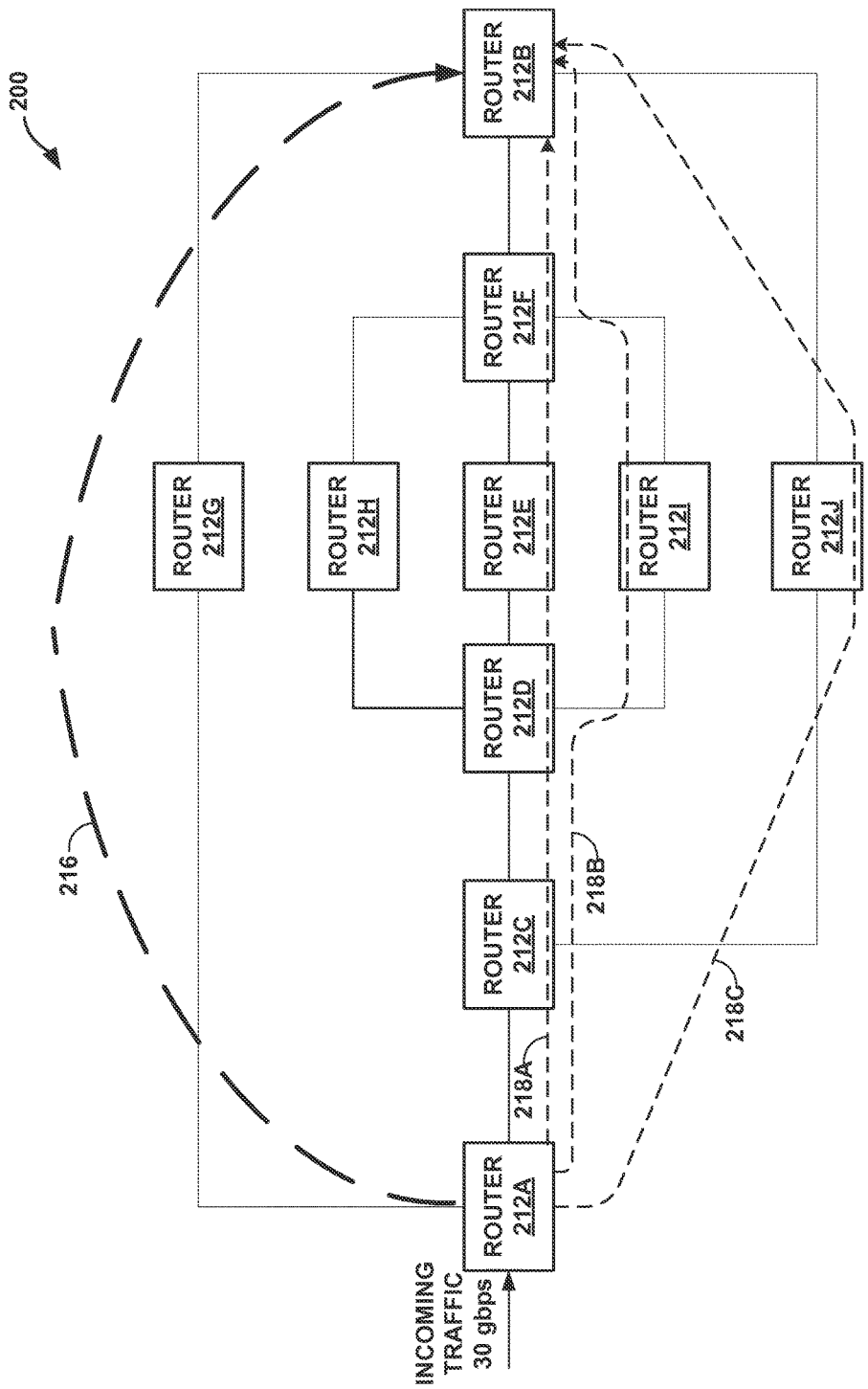
FIGS. 9A-9C are block diagrams illustrating exemplary computer networks having a dynamic load balancing multi-path LSP established over the network between an ingress router and an egress router.
Figure 9B:
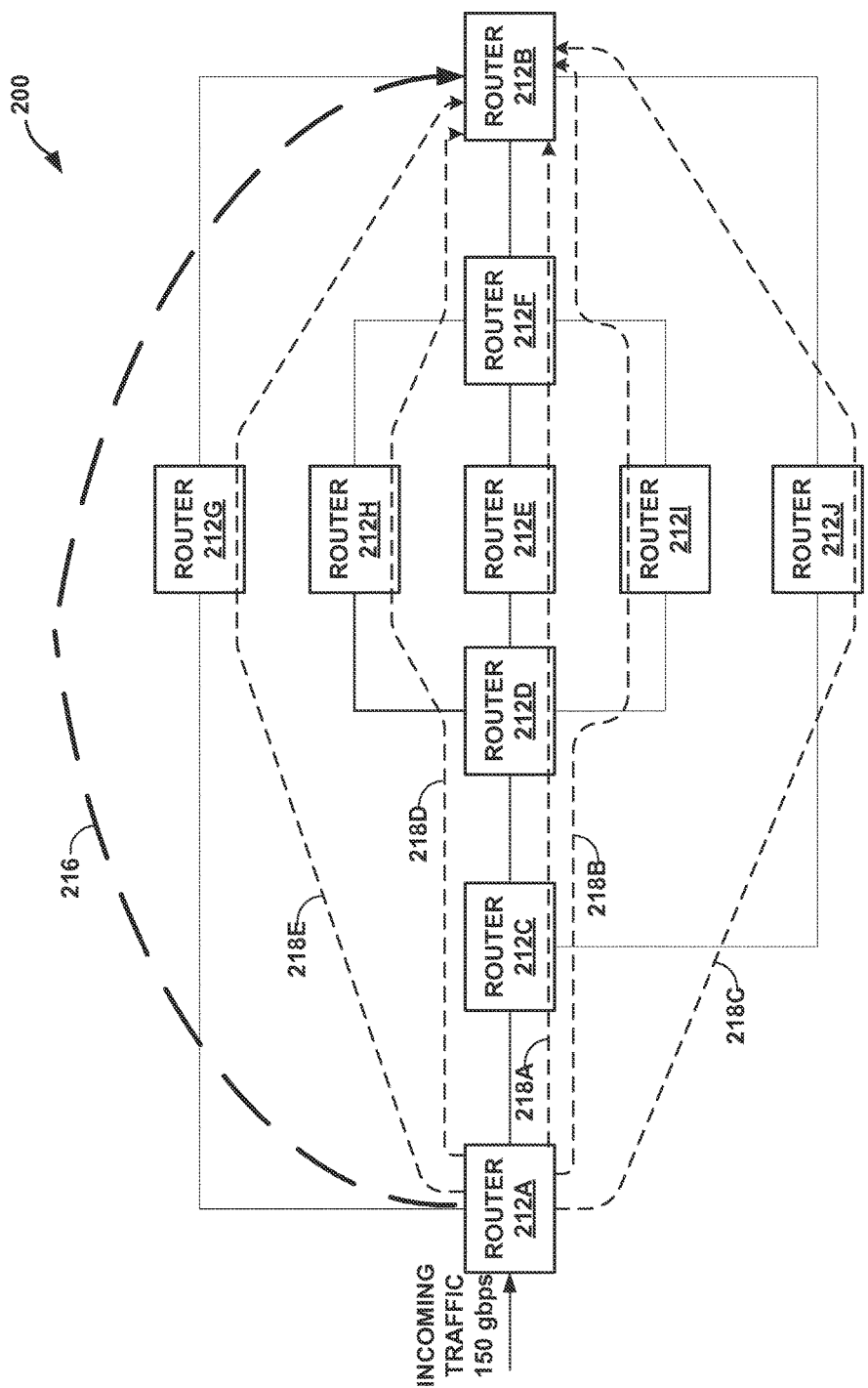
Figure 9C:
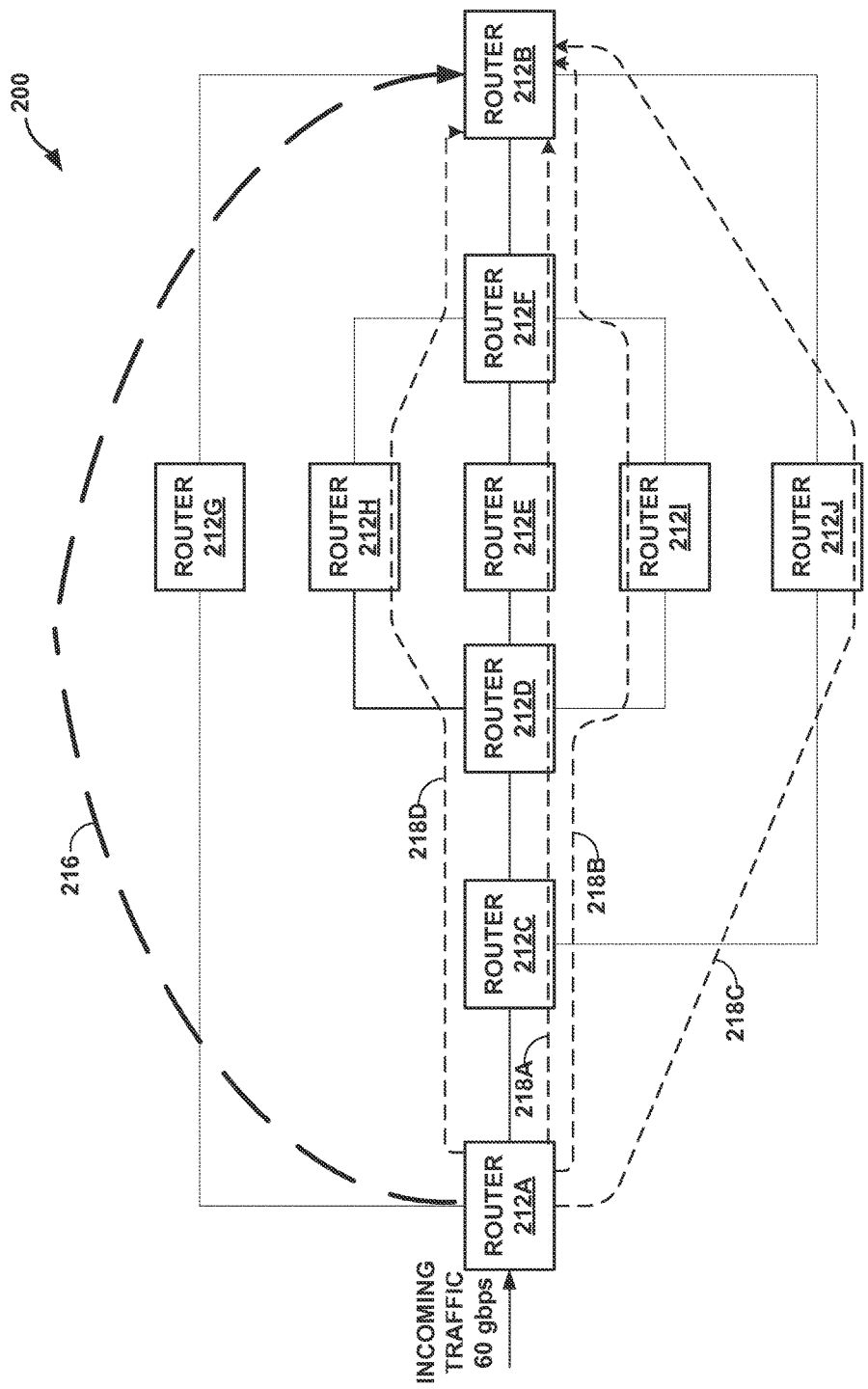

FIGS. 9A-9C are block diagrams illustrating exemplary computer networks having a dynamic load balancing TE LSP established between an ingress router and an egress router. FIG. 9A illustrates a system 200 that includes a plurality of routers 212A-212J ("routers 212"). System 200 has a dynamic load balancing TE LSP 216 established between an ingress router 212A and an egress router 212B. Router 212A can be configured to establish the dynamic overall RSVP-TE LSP 216 and can be configured with automatic bandwidth parameters associated with the overall LSP 216 to allow router 212A to dynamically and automatically adjust the number of sub-paths of the overall LSP 216 and reserved bandwidth of each of the sub-paths, based on changes in traffic demand detected at router 212A. The term "sub-path" may be used herein interchangeably with the terms "sub-LSP" and "ECMP segment."

System 200 may include a greater number of routers 212 than are shown in FIG. 9A. The ultimate sources of the network traffic being load balanced may comprise one or more devices and/or any public or private network or the Internet that provides traffic to ingress router 212A in network 214. The ultimate destinations of the network traffic being load balanced may comprise one or more destination devices and/or network that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 214.

Initially, an administrator may configure router 212A to establish dynamic overall LSP 216. For example, the administrator can configure values for automatic bandwidth adjustment parameters associated with overall LSP 216, such as a maximum bandwidth, minimum bandwidth, adjustment threshold, adjustment interval, sampling interval, and/or other parameters. Router 212A can signal the dynamic overall LSP 216 to be established in a similar manner as described above with respect to FIG. 1, such as by computing a plurality of different sub-paths from router 212A to router 212B, sending resource reservation protocol Path requests along selected ones of the computed sub-paths, and receiving resource reservation protocol Resv message in response.

An amount of network traffic being received at ingress router 212A may change frequently, having periods of low demand as well as high demand. For example, traffic demand at router 212A may be less at night than during the day. The techniques of this disclosure provide automatic bandwidth adjustment functionality for a load-balancing traffic-engineered multi-path overall LSP 216, and use the automatic bandwidth adjustment to intelligently and dynamically re-signal the multi-path overall LSP. Based on dynamically changing bandwidth requirements as detected in the forwarding plane of router 212A, overall LSP 216 can be re-sized by adding more sub-paths 218 (ECMP segments) or deleting existing sub-paths. The ability of router 212A to dynamically and automatically manipulate the number of sub-paths and the reserved bandwidth amount on each sub-path can allow for more efficient use of available bandwidth in the network. The techniques of this disclosure can also reduce a need for manual configuration in the network.

In the example of FIG. 9A, in establishing the overall LSP, router 212A computes and establishes sub-paths 218A, 218B, and 218C to the egress router 212B, where a sum of bandwidth reserved along each of the sub-paths satisfies a traffic-engineering constraint comprising a bandwidth requirement for the overall LSP. Router 212A may be configured with an initial current reserved bandwidth of 30 gigabits per second (gbps). In the example of FIG. 9A, sub-path 218A is signaled over the path 212A-212C-212D-212E-212B. Sub-path 218B is signaled over the path 212A-212C-212D-2121-212F-212B. Sub-path 218C is signaled over the path 212A-J-212B. Router 212A sets up each of sub-paths 218A-218C using Path requests that indicate the same forwarding equivalence class (FEC), and may use sub-path identifiers (IDs) that uniquely identify sub-paths 218 of overall load-balancing LSP 216. As one example, router 212A may establish each of sub-paths 218A-218C to have 10 gigabits per second of reserved bandwidth.

Router 212A then forwards received network traffic to the egress router 212B over the overall LSP 216 by load balancing the network traffic across the sub-paths 218 of the overall LSP 216. In addition, ingress router 212A analyzes traffic statistics for network traffic received at router 212A on a tunnel interface associated with the overall LSP 216. The tunnel interface may include an ECMP interface mapped to a plurality of equal cost multi-paths represented by the plurality of different sub-paths 218 of overall LSP 216. Router 212A may determine, based on the analysis of the traffic statistics, that a network traffic demand detected by ingress router 212A on the tunnel interface differs from a currently reserved bandwidth of the overall LSP 216 by at least a threshold amount. In response to determining this, ingress router 212A automatically adds a sub-path to or removes a sub-path from the plurality of different sub-paths 218 of overall LSP 216 to adjust capacity of overall LSP 216 to correspond to the currently reserved bandwidth.

Routers 212 may advertise available bandwidth of adjacent links using an IGP-TE route advertisement, e.g., using ISIS-TE or OSPF-TE. Router 212A may store the available bandwidth as advertised by its peers in a traffic engineering database (TED), and may use the available bandwidth information when computing the sub-paths 218. In addition to available bandwidth, the TED may store costs of each sub-path, such as latency, metric, number of hops, link color, and Shared Risk Link Group (SRLG), or other characteristics that may be used as traffic-engineering constraints.

In one example operation, once every sampling interval (e.g., 5 minutes), or at other times according to configuration, router 212A may measure an average traffic demand flowing through a tunnel interface associated with overall LSP 216. Once every adjustment interval (e.g., 15 minutes), router 212A may compute the maximum of the average traffic demand measured in each sampling interval. If router 212A determines that the maximum traffic demand differs from the current reserved bandwidth by more than the adjustment threshold and is within the minimum and maximum bandwidth, router 212A may invoke a constrained shortest path first (CSPF) algorithm with the maximum traffic demand as the new reserved bandwidth amount, to select an updated set of sub-paths 218 that satisfy the maximum traffic demand.

Router 212A, in determining whether and how to re-signal overall LSP 216, determines whether to add or remove sub-paths 218 from the overall LSP 216 to accommodate the changing traffic demand. For example, assume the minimum and maximum bandwidth amounts are 5 gigabits per second and 200 gigabits per second, respectively. Router 212A detects that the maximum average traffic demand differs from the current reserved bandwidth of 30 gigabits per second by an amount greater than the threshold amount. For example, router 212A may determine a maximum traffic demand of 150 gigabits per second. If the adjustment threshold is 10 gigabits, the difference between 150 and 30 gigabits per second (120 gigabits per second) is well over the adjustment threshold, so router 212A invokes a new CSPF computation using the maximum traffic demand of 150 gigabits per second as the new reserved bandwidth. In so doing, router 212A may adjust the amount of reserved bandwidth on one or more of sub-paths 218A-218C (such as by sending updated Path messages), and/or router 212A may also compute new sub-paths of LSP 216 to handle the increased traffic demand. For example, it may be the case that sub-paths 218A-218C together cannot handle the new maximum average traffic demand of 150 gigabits per second. Router 212A may refer to the available bandwidth according to traffic engineering links stored in the TED to decide how best to re-signal overall LSP 216.

In deciding whether to add or remove sub-paths in response to changes to traffic demand, router 212A may use heuristics based on one or more options that can be selected by the network provider. An algorithm used to determine whether to add or remove sub-paths can be tailored to network provider preferences. For example, router 212A may be configured to favor having links utilized substantially to capacity, and may ensure that existing sub-paths 218 are substantially saturated before creating new sub-paths 218 for the overall LSP 216. As another example, router 212A may be configured to favor a greater number of more lightly loaded sub-paths.

In the example of FIG. 9B, router 212A adds sub-paths 218D and 218E to overall LSP 216 to accommodate the increased traffic demand of 150 gigabits per second. Sub-path 218D follows the path of 212A-212G-212B, and sub-path 218E follows the path of 212A-212C-212D-212H-212E-212B. As one example, router 212A may reserve 30 gigabits per second on each of sub-paths 218A-218E. As another example, router 212A may reserve 40 gigabits per second on each of sub-paths 218D and 218E, 20 gigabits per second on sub-path 218A, and 25 gigabits per second on each of sub-paths 218B and 218C. Router 218A can send Path update messages to update reserved bandwidth of sub-paths 218A, 218B, and 218C as needed to reflect the increased amounts.

At another point in time, router 212A may compute that the maximum average traffic demand has dropped to only 60 gigabits per second. Again, this value differs from the current reserved bandwidth (150 gigabits per second) by greater than the adjustment threshold value, so router 212A invokes a new CSPF computation using the new maximum traffic demand of 60 gigabits per second as the new reserved bandwidth. In so doing, router 212A may adjust the amount of reserved bandwidth on one or more of sub-paths 218A-218E, such as by sending updated Path messages. Additionally or alternatively, router 212A may remove one or more of sub-paths 218 from overall LSP 216 if the extra bandwidth is not needed. For example, in the example of FIG. 9C, router 212A has removed sub-path 218E from overall LSP 216 (e.g., by sending a PathTear message), leaving sub-paths 218A-218D. Router 212A can split the 60 gigabits per second of reserved bandwidth among the sub-paths 218A-218D as router 212A determines is appropriate.

In some cases, during the CSPF computation router 212A may select a subset of one or more sub-paths from among a plurality of eligible sub-paths (e.g., a plurality of equal-cost paths) to egress router 212B. Router 212A may be configured with one or more tie-breaker options that guide which sub-paths to prefer. For example, router 212A may be configured to prefer sub-paths having lower latency, lower number of hops along the sub-paths, sub-paths avoiding certain geographical locations, sub-paths having certain metrics, or other characteristics. Router 212A can obtain information regarding the latency, round-trip time, geographical locations, or other characteristics of links along the sub-paths by IGP-TE advertisements. Operators may configure router 212A with one or more of these tie-breaker preference options to tailor the dynamic sub-path modifications to the needs of the provider.

In a similar manner as described above with respect to FIGS. 3-6, router 212A may also be configured to run an optimization algorithm from time to time that determines whether to update the mapping of hash map 80 (FIG. 3) in order to re-balance traffic across multiple sub-paths of a single overall LSP 216 consistent with load balancing requirements 87. In this optimization, link monitoring module 68 may update the hash map 80 if traffic flow statistics 86 indicate that the actual packet flows being mapped are not meeting the load balancing requirements 87 that were set when the overall RSVP-TE LSP was established using the extended RSVP-TE LSP. Router 212A may be configured to run the optimization algorithm on a periodic basis, or may be configured to select an appropriate time to run the optimization and update mappings of hash values to next hops to prevent out of sequence delivery of packets while balancing traffic across the sub-paths. In some cases, router 212A may run the optimization algorithm and determine that no changes are needed. In this way, router 212A can from time to time "repack the bins" (sub-paths) as needed to maintain an appropriate distribution of packet flows to sub-paths.

In this manner, after the initial configuration, router 212A is able to automatically adapt to large changes in traffic demand without requiring any manual configuration to add or remove LSPs. The techniques described herein do not require a dedicated LSP having a large amount of reserved bandwidth persistently set up in the network, which would tie up bandwidth reservation even during times of low demand when the bandwidth is not needed. Instead, router 212A is able to automatically scale up or down the reserved bandwidth of overall LSP 216 by automatically and dynamically adding or deleting (removing) sub-paths to LSP 216 in response to changing network traffic demands.

Automatic bandwidth adjustment that is limited to a single point-to-point (P2P) LSP may be insufficient when there is a large amount of traffic demand, because a single P2P LSP may not have a path with sufficient bandwidth to accommodate the large demand. The dynamic automatic bandwidth adjustment techniques described herein in the context of a multi-path overall LSP described herein can automatically add or remove sub-paths of the multi-path overall LSP to automatically adjust the reserved bandwidth of the multi-path overall LSP. A network operator need only set up the single entity of the multi-path overall LSP, and router 212A dynamically handles the rest to react to significant fluctuations in network traffic demand.

Further details relating to RSVP multi-path overall LSPs using sub-LSPs are described in K. Kompella, "Multi-path Label Switched Paths Signaled Using RSVP-TE," Network Working Group, Internet-Draft, draft-kompella-mpls-rsvp-ecmp-01, Oct. 31, 2011; U.S. patent application Ser. No. 12/507,200, entitled "Load Balancing Network Traffic on a Label Switched Path Using Resource Reservation Protocol with Traffic Engineering," filed Jul. 22, 2009; and U.S. patent application Ser. No. 13/456,046, entitled "Load Balancing Network Traffic on a Label Switched Path Using Resource Reservation Protocol with Traffic Engineering," filed Apr. 25, 2012; the entire contents of each of which are incorporated herein by reference.

Figure 10:
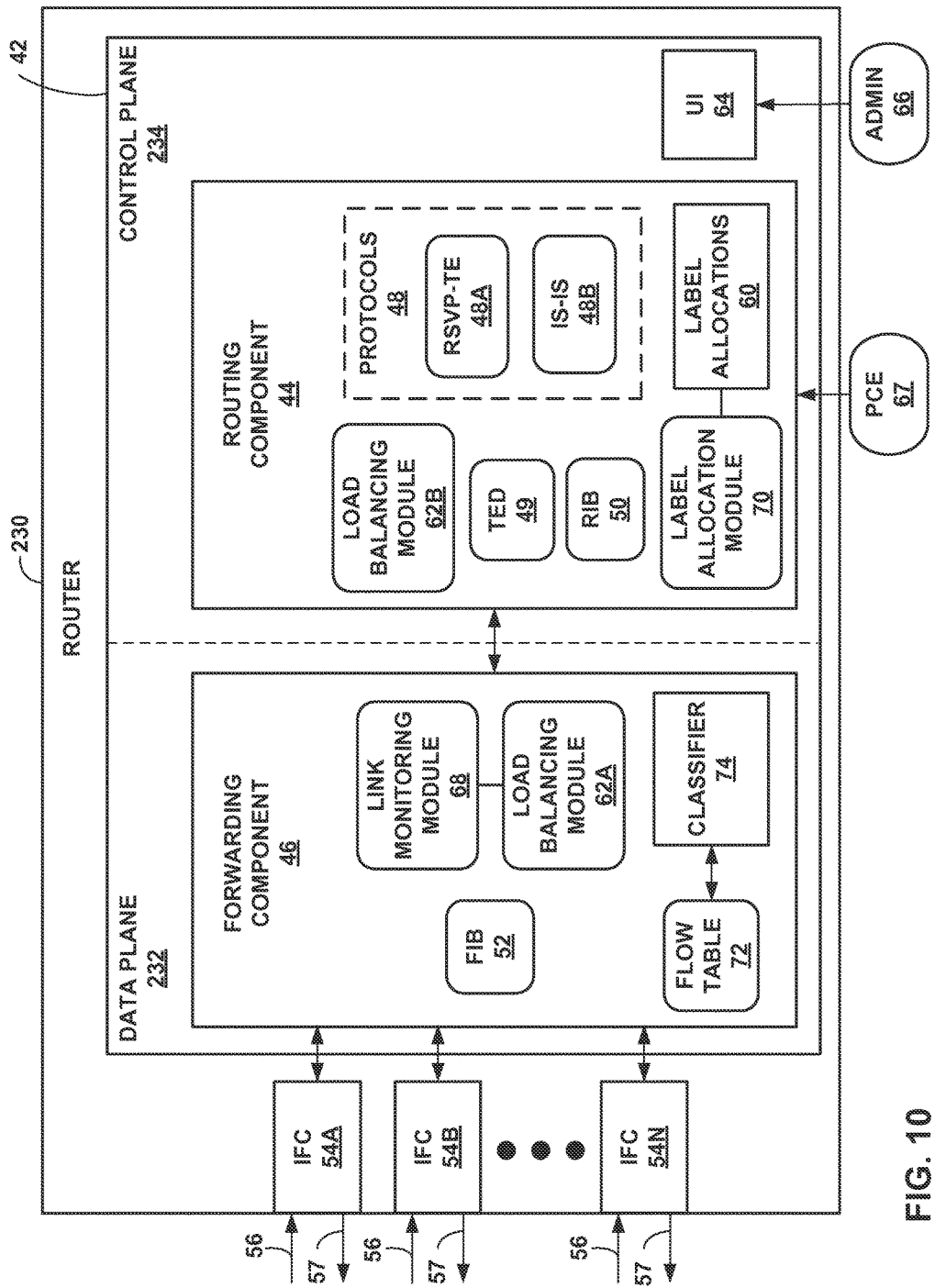
FIG. 10 is a block diagram illustrating an exemplary router capable of supporting RSVP-TE with dynamic load balancing extensions in accordance with the techniques described herein.

FIG. 10 is a block diagram illustrating an exemplary router 230 capable of supporting RSVP-TE with dynamic load balancing extensions in accordance with the techniques described herein. Router 230 includes a number of like components as router 40 of FIG. 10, and these like components may operate in a similar manner as described above with respect to router 40. Router 230 includes a data plane 232 that includes forwarding component 46. In some aspects. IFCs 54 may be considered part of data plane 232. Router 230 also includes control plane 234. Control plane 234 includes routing component 44 and user interface (UI) 64. Although described for purposes of example in terms of a router, router 230 may be more generally any network device capable of performing the techniques of this disclosure, such as a network device that includes routing functionality and other functionality.

As shown in FIG. 10, control plane 234 of router 230 includes load balancing module 62B. Load balancing module 62B in the control plane 234 may cooperate with load balancing module 62A in the forwarding plane 232 to carry out functionality for dynamic load balancing TE LSPs with automatic bandwidth capabilities, as described herein. Details of the operation of link monitoring module 68, load balancing module 62A, and load balancing module 62B, are described in further detail below.

In the example of FIG. 10, IS-IS 48B of router 230 can receive advertisements from other routers 212 of system 200, formed in accordance with traffic engineering extensions to include available, unreserved bandwidth for advertised links. IS-IS 48B of router 230 can also send such advertisements to other routers advertising available bandwidth. IS-IS 48B stores advertised available bandwidth values for advertised links in traffic engineering database (TED) 49. Router 230 may use the available bandwidth information from TED 49 when computing the sub-paths 218. In addition to available bandwidth, the TED 49 may store costs of each advertised link, such as latency, metric, number of hops, link color, and Shared Risk Link Group (SRLG), geographic location, or other characteristics that may be used as traffic-engineering constraints. Routers 212 may determine available bandwidth of their associated links, as described in U.S. Ser. No. 13/112,961, entitled "Weighted Equal-Cost Multipath," filed May 20, 2011, the entire contents of which are incorporated by reference herein.

In some aspects, classifier 74 identifies new packet flows and classifies inbound packets received on inbound links 56 to packet flows referenced by flow table 72. A "packet flow," as used herein, refers a sequence of packets sent from a particular source to a particular unicast, anycast, or multicast destination that the source device labels as a flow, and may be associated with a set of packet header field values and/or packet data that cause any packet containing such values to be assigned to a particular sub-path 218 in overall LSP 216 toward that packet's destination. In addition, a packet flow may be the minimum granularity at which router 230 maintains state in flow table 72 for forwarding network packets that are classified to a packet flow referenced in flow table 72. Classifier 74 may classify packets to a packet flow referenced in flow table 72 by, for example, their respective <source IP address, destination IP address, protocol identifier> 3-tuple value or by their respective <source IP address, destination IP address, source port, destination port, protocol identifier> 5-tuple value.

Flow table 72 comprises a data structure, e.g., a table, for storing information or data in packet flow entries each pertaining to a different packet flow traversing router 230. Such data includes in some instances a reference to a next-hop structure in forwarding information 70 that specifies a path. Although illustrated and described as a table, the data in flow table 72 may be stored to any other data structure, such as a graph, a linked-list, etc. Flow table 72 stores data describing each flow previously identified by classifier 74, e.g., the five-tuple and other information pertinent to each flow. That is, flow table 72 may specify network elements associated with each active packet flow, e.g., source and destination devices and ports associated with the packet flow. Flow table 72 may also include a unique application identifier (ID) for each flow that uniquely identifies the application to which each flow corresponds.

To associate the new flow with the selected next-hop, forwarding component 46 can add a reference (e.g., a pointer that resolves to a next-hop or an index) to the selected next-hop in the FIB 52 in the flow table 72 entry generated by classifier 74 for the new flow. The reference to the selected next-hop in the flow table 72 entry for the new flow causes forwarding component 46 of data plane 232 to forward packets of the new flow to the selected next-hop.

Although described herein for purposes of example with respect to router 212A making the decisions of whether to add or delete sub-paths or reallocate network traffic load balancing ratios on the sub-paths, in some aspects, some of the decision-making may also occur on other routers 212 along the sub-paths. For example, router 212D may detect that a failure has occurred along the path 212D, 212H, 212F such as a link or node failure. In response to detecting the failure, router 212D can determine that it has two other paths to router 212F, and can automatically update its forwarding information to reroute the traffic from sub-path 218D away from router 212H and onto one of the other paths to 212F, effectively "repacking the bins," where the "bins" represent the remaining available sub-paths 218. Router 212D has seen all of the RSVP-TE signaling when sub-paths 218 were established, so router 212D knows that other sub-paths are associated with the overall LSP 216, and can reroute the network traffic onto a different one of these sub-paths, using the RSVP-TE labels that are already being used in the forwarding plane for the other sub-paths of overall LSP 216. For example, a link monitoring module 68 of router 212D communicates with load balancing module 62A of router 212D to cause load balancing module 62A to update a hash map such that traffic is diverted from the failed link onto other remaining links over which the traffic for the overall RSVP-TE LSP is being load balanced. Load-balancing LSPs may therefore provide improved network resilience and fast reroute functionality, without requiring dedicated backup LSP tunnels just for failure cases.

FIG. 1 is a block diagram illustrating an example of a link monitoring module 68 and load balancing module 62A-62B of FIG. 10 in greater detail. Link monitoring module 68 and load balancing module 62A may include some or all of the functionality described above with respect to FIGS. 2-6, in addition to the functionality described below.

Figure 11:
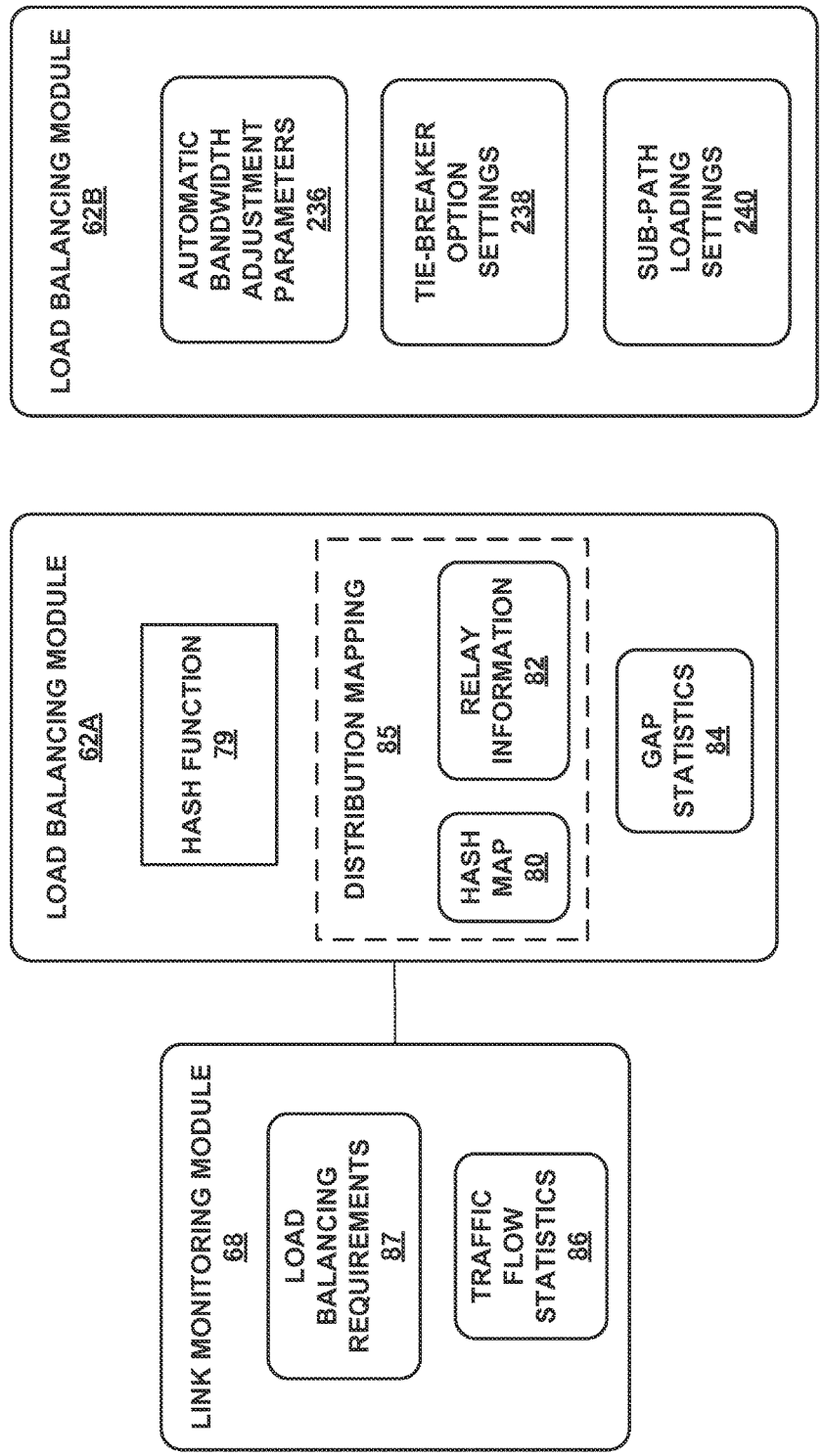
FIG. 11 is a block diagram illustrating an example of a load balancing module and link monitoring modules of FIG. 10 in greater detail.

In the example of FIG. 11, load balancing module 62B includes automatic bandwidth adjustment parameters 236, tie-breaker option settings 238, and sub-path loading settings 240, each of which may be configured by administrator 66 via user interface 64. Automatic bandwidth adjustment parameters 236 may include automatic bandwidth parameters set for one or more overall LSP tunnels configured at router 230 for which router 230 is the ingress router, such as overall LSP 216 of FIGS. 9A-9C. For example, automatic bandwidth adjustment parameters 236 may include parameters such as tunnel bandwidth (currently reserved bandwidth), maximum bandwidth, minimum bandwidth, adjustment threshold, adjustment interval, sampling interval, and/or other parameters. The tunnel bandwidth specifies the value of the traffic engineering bandwidth that is currently reserved on the tunnel. The maximum bandwidth specifies the greatest amount of bandwidth that can be configured on the tunnel, and the minimum bandwidth specifies the least amount of bandwidth that can be configured on the tunnel. The adjustment threshold specifies an amount by which the maximum or average traffic demand must differ from the currently reserved bandwidth before load balancing module 62B will trigger RSVP-TE 48A to re-signal the tunnel with an updated value of currently reserved bandwidth, including adding or deleting sub-paths of the overall LSP tunnel. The adjustment interval (application frequency) specifies how often an overall LSP tunnel's bandwidth can be changed. The sampling interval specifies how often the link monitoring module 68 may measure a value such as maximum or average traffic demand.

Link monitoring module 68 maintains traffic flow statistics 86, which track the amount of traffic associated with each of the hash values as described above. Traffic flow statistics 86 may also store the maximum average traffic demand (in bandwidth) in a given time period, and/or the average traffic demand (in bandwidth) in a given time period. Traffic flow statistics 86 may also store a delta value representing the difference between a tunnel's highest recorded traffic demand bandwidth and its currently reserved bandwidth, and/or the difference between a tunnel's maximum average traffic demand bandwidth and its currently reserved bandwidth.

Tie-breaker option settings 238 may be configured by administrator 66 with settings of one or more tie-breaker options that affect how router 230 chooses paths during the CSPF computation. For example, if router 230 identifies a plurality of paths as candidates for sub-paths of the overall LSP, router 230 can use the tie-breaker option settings 238 to choose a subset of the plurality of candidate paths. Possible tie-breaker options that may be used include latency, metric, number of hops, geographic location, for example. A service provider may choose which, if any, of these tie-breaker options will be used.

As one example, the characteristic of cost of each sub-path (ECMP segment) may be used by RSVP-TE 48A to dictate which paths are chosen during CSPF computation. In one example, assuming there are sixteen ECMP paths available from the ingress to the egress, RSVP-TE 48A can use the latency tie-breaker option settings to select the seven lowest-latency paths that will be sufficient to setup the LSP. This characteristic can allow one to effectively engineer a network, without causing undesirable side effects, such as latency inflation. For example, one would possibly want to avoid going from San Jose to Los Angeles via Paris, unless there is no other option available.

Sub-path loading settings 240 specify preferences as to how sub-paths of an overall LSP should be loaded. For example, the sub-path loading settings 240 can be set to indicate a preference for a greater number of lightly loaded sub-paths, where each of the sub-path has a smaller percentage of its bandwidth capacity utilized. As another example, sub-path loading settings 240 can be set to indicate a preference for a smaller number of heavily loaded sub-paths. In one example aspect, sub-path loading settings 240 may be expressed as a percentage of capacity for individual sub-paths. One example setting may be that the total available bandwidth capacity of all sub-paths should be at least 80% used by the overall LSP before adding additional sub-paths. Another example setting may be that the total available bandwidth capacity of all sub-paths should be no more than 30% used by the overall LSP, after which additional sub-paths should be added. The available bandwidth capacity of links along the sub-paths may be obtained from TED 49 to determine the total available bandwidth capacity of the sub-paths.

Figure 12:
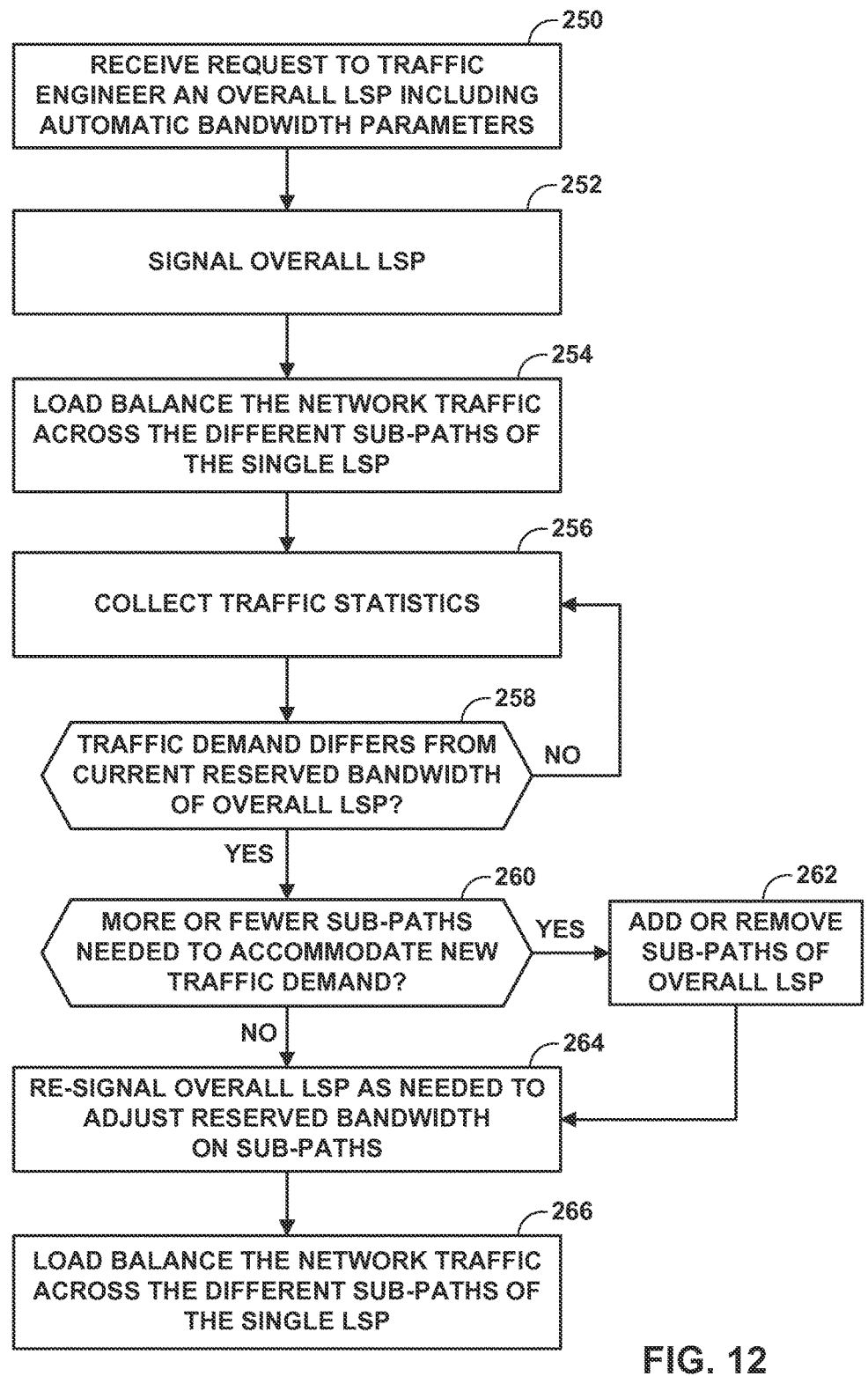
FIG. 12 is a flowchart illustrating exemplary operation of a router in accordance with the techniques of this disclosure.

FIG. 12 is a flowchart illustrating exemplary operation of a network device, such as a router, in accordance with the techniques of this disclosure. FIG. 12 will be explained with reference to routers 212 of FIGS. 11A-11C and router 230 of FIG. 10. Router 212A may receive a request to traffic-engineer a dynamic overall RSVP-TE LSP (e.g., tunnel 216 of FIG. 9A) that satisfies certain constraints. For example, a network administrator may configure router 212A with the request (250). Constraints imposed may include, for example, bandwidth, link color, Shared Risk Link Group (SRLG), and the like. In addition, the network administrator may configure router 212A with automatic bandwidth adjustment parameters 236, tie-breaker option settings 238, and sub-path loading settings 240.

As one example, the network administrator may wish to configure an overall LSP that can initially handle 30 gigabits per second of network traffic. RSVP-TE 48A uses constraint information about links within network 214, such as bandwidth availability, to compute the sub-paths that satisfy the constraints. For example, RSVP-TE 48A may use bandwidth availability information accumulated by a link-state interior routing protocol, such as the Intermediate System-Intermediate System (IS-IS) 48B or the Open Shortest Path First (OSPF) protocol. RSVP-TE 48A computes multiple paths for which certain constraints, including bandwidth, provide the requisite bandwidth availability in sum. RSVP-TE 48A may be configured with an upper limit on how many paths can be computed and/or selected.

Router 212A signals the overall LSP 216 based on the configuration (252). For example, for each of the selected sub-paths, RSVP-TE 48A may generate and send a Path message associated with the same overall RSVP-TE LSP. Router 212A may then receive label advertisements with RSVP-TE 48A via Resv messages in response to the Path messages. Router 212A may update relay information 82 to reflect the how the received labels map to next hops. In some cases, such as where router 212A may be an intermediate router along the overall LSP, router 212A may also allocate labels, store the label allocations, distribute the labels, and reserve bandwidth on links using RSVP-TE 48A to generate Resv messages as described above.

Upon receiving network traffic that router 212A determines is destined for egress router 212B, load balancing module 62A of router 212A determines one of links 22A, 22B through which to send the packet by applying hash function 79 to the packet header, e.g., the 5-tuple {source IP address, destination IP address, source port number, destination port number, protocol}. Hash function 79 outputs a value, which load balancing module 62A maps to relay information 82 based on hash map 80. Relay information 82 returns an MPLS label to apply to the packets of the packet flow for the network traffic, and a next hop for forwarding the labeled packets. In this manner, router 212A load balances the packet flows across sub-paths 218A, 218B, and 218C (254). For example, distribution mapping 85 may map different packet flows to sub-paths 218A or 218B according to the load balancing requirements 87. Link monitoring module 68 may update the hash map 80 if traffic flow statistics 86 indicate that the actual packet flows being mapped are not meeting the load balancing requirements 87 that were set when the overall RSVP-TE LSP was established using the extended RSVP-TE LSP.

Link monitoring module 68 of router 212A collects and maintains traffic flow statistics 86 (256), which track the amount of traffic associated with each of the hash values as described above. For example, traffic flow statistics 86 may also store the maximum average traffic demand (in bandwidth) in a given time period, and the difference between a tunnel's maximum average traffic demand bandwidth and its currently reserved bandwidth. The traffic demand bandwidth can be based on a rate of packets or other data unit per unit time.

If link monitoring module 68 determines that the traffic demand (e.g., as reflected by the maximum average traffic demand rate) differs from the current reserved bandwidth of the overall LSP 216 by greater than the adjustment threshold amount (YES branch of 258), load balancing module 62B may determine whether more or fewer sub-paths are needed to accommodate the new traffic demand (260). Load balancing module 62B may make this determination based on sub-path loading settings 240 and information stored in TED 49 about available bandwidth on links along current sub-paths 218.

For example, if the existing sub-paths 218 of the overall LSP 216 have sufficient available bandwidth to accommodate added traffic without going beyond the loading preferences expressed in sub-path loading settings 240, load balancing module 62B may decide not to add or remove any sub-paths (NO branch of 260). As another example, if the existing sub-paths 218 of the overall LSP 216 do not have sufficient available bandwidth to accommodate added traffic without going beyond the loading preferences expressed in sub-path loading settings 240 (YES branch of 260), load balancing module 62B may decide to add sub-paths (262). As a further example, if a decrease in traffic demand means that traffic will be thinly spread across existing sub-paths 218, i.e., the existing sub-paths 218 of the overall LSP 216 will each have a smaller amount of bandwidth inconsistent with sub-path loading settings 240 (YES branch of 260), load balancing module 62B may decide to delete sub-paths (262). If more sub-paths are needed, load balancing module 62B may invoke RSVP-TE 48A to send a new RSVP Path message along a new sub-path 218 to establish the sub-path. If fewer sub-paths are needed, load balancing module 62B may invoke RSVP-TE 48A to send a RSVP PathTear message to tear down one or more of sub-paths 218. The PathTear message can include a sub-path identifier that identifies the sub-path to be torn down.

Whether or not any sub-paths 218 are added or removed from the dynamic overall LSP 216, load-balancing module 62B may determine that it is appropriate to re-signal the existing sub-paths 218 of the overall LSP 216 to adjust the amount of currently reserved bandwidth on the sub-paths based on the different traffic demand (264). Load-balancing module 62B may invoke RSVP-TE module 48A to send an updated Path message along one or more of sub-paths 218 to modify the amount of bandwidth currently reserved along the sub-path, such as by increasing or decreasing the amount of bandwidth currently reserved. The sum of the amounts of bandwidth currently reserved on all of the sub-paths 218 of the overall LSP 216 is equal to the new traffic demand, i.e., the maximum average traffic demand measured by link monitoring module 68 of the forwarding plane 232. Router 212A then load balances received network traffic destined for egress router 212B across the different sub-paths of the overall LSP 216 (266).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
by an ingress device, establishing an overall multi-path label switched path (LSP) from the ingress device to an egress device, wherein the overall multi-path LSP includes a plurality of different sub-paths to the egress device that satisfy a traffic-engineering constraint, wherein each of the sub-paths comprises a sub-LSP of the overall multi-path LSP, and wherein at least two of the sub-paths traverse different sets of nodes within a network between the ingress device and the egress device;
forwarding received network traffic to the egress device over the overall multi-path LSP by load balancing the network traffic across the sub-paths of the overall multi-path LSP;
by the ingress device, analyzing traffic statistics for network traffic received at the ingress device on a tunnel interface associated with the overall multi-path LSP;
determining, by the ingress device, based on the analysis of the traffic statistics, that a network traffic demand detected by the ingress device on the tunnel interface differs from a currently reserved bandwidth of the overall multi-path LSP by at least a threshold amount; and
in response to the determining, by the ingress device, automatically adding a sub-path to or removing a sub-path from the plurality of different sub-paths of the overall multi-path LSP to adjust capacity of the overall multi-path LSP to correspond to the network traffic demand.

2. The method of claim 1, wherein the traffic-engineering constraint includes a bandwidth requirement for the overall multi-path LSP, wherein a sum of bandwidth reserved along each of the sub-paths satisfies the bandwidth requirement for the overall multi-path LSP.

3. The method of claim 1, further comprising re-signaling one or more of the plurality of sub-paths of the overall multi-path LSP to adjust an amount of currently reserved bandwidth on the sub-paths based on the network traffic demand.

4. The method of claim 1, wherein adding a sub-path comprises sending a resource reservation request along the sub-path to be added, wherein the resource reservation request includes the identifier associating the request with the same overall multi-path LSP, and wherein the resource reservation request includes an indicator specifying the overall multi-path LSP as a load-balancing LSP.

5. The method of claim 1, wherein removing a sub-path comprises sending a resource reservation PathTear message to tear down the sub-path, wherein the PathTear message includes the identifier associating the request with the same overall multi-path LSP, and wherein the PathTear message includes a sub-path identifier that identifies the sub-path to be removed.

6. The method of claim 1, wherein analyzing the traffic statistics comprises analyzing a rate of data traffic received for the tunnel interface associated with the overall multi-path LSP.

7. The method of claim 1, wherein analyzing the traffic statistics comprises analyzing a maximum average traffic demand measured on the tunnel interface during a time interval.

8. The method of claim 1, wherein analyzing the traffic statistics comprises analyzing the traffic statistics at configured time intervals.

9. The method of claim 1, further comprising receiving configuration information specifying loading preferences that indicate a percent of available bandwidth capacity of each of the sub-paths of the overall multi-path LSP that should be utilized for the overall multi-path LSP before adding additional sub-paths.

10. The method of claim 9, further comprising, by the ingress router, in response to determining that the plurality of sub-paths of the overall multi-path LSP do not have sufficient available bandwidth to accommodate the network traffic demand without going beyond the loading preferences, adding one or more sub-paths to the plurality of sub-paths of the overall multi-path LSP.

11. The method of claim 9, further comprising:
by the ingress router, in response to determining that to decrease currently reserved bandwidth on each of the plurality of sub-paths of the overall multi-path LSP to adjust to a network traffic demand below the currently reserved bandwidth will result in each of the plurality of sub-paths having too little bandwidth with respect to the loading preferences, deleting one or more sub-paths from the plurality of sub-paths of the overall multi-path LSP.

12. The method of claim 1, wherein the traffic-engineering constraint comprises one or more of bandwidth, link color, and Shared Risk Link Group (SRLG), latency, number of hops, and geographic location.

13. The method of claim 1, wherein establishing the overall multi-path LSP comprises giving preference to sub-paths having lower latency when selecting sub-paths of the overall multi-path LSP from among a plurality of possible sub-paths.

14. The method of claim 1, wherein establishing the overall multi-path LSP comprises giving preference to sub-paths having a lower number of hops when selecting sub-paths of the overall multi-path LSP from among a plurality of possible sub-paths.

15. The method of claim 1, further comprising receiving automatic bandwidth configuration parameters comprising one or more of a minimum bandwidth amount for the overall multi-path LSP, a maximum bandwidth amount for the overall multi-path LSP, an adjustment threshold, an adjustment interval, and a sampling interval.

16. The method of claim 1, further comprising re-signaling one or more of the plurality of sub-paths of the overall multi-path LSP to adjust an amount of currently reserved bandwidth on the sub-paths based on the different traffic demand.

17. The method of claim 1, further comprising:
configuring a forwarding plane of the ingress device to store allocated labels and corresponding next hops for the sub-paths of the overall multi-path LSP;
configuring the forwarding plane with load balancing requirements that specify how network traffic is to be load-balanced across the sub-paths of the overall multi-path LSP;
receiving network traffic at the ingress device of the overall multi-path LSP;
in the forwarding plane of the ingress device, load balancing the network traffic across the sub-paths by selecting from among the stored labels and corresponding next hops for forwarding the network traffic in accordance with load balancing requirements; and
forwarding the network traffic with the selected labels onto sub-paths of the overall multi-path LSP.

18. The method of claim 1, wherein the network traffic comprises packets associated with a plurality of packet flows destined for the egress device of the overall multi-path LSP, wherein load balancing the network traffic across the sub-paths comprises applying flow-level load balancing to the received network traffic.

19. The method of claim 1, wherein load balancing the network traffic comprises applying a hash function to a portion of a packet of the network traffic, and accessing a hash map based on the hash function to determine a Multiprotocol Label Switching (MPLS) label to apply to the packet and an output interface from which to output the packet.

20. The method of claim 1, further comprising load balancing the network traffic across the sub-paths without re-ordering packets in packet flows of the network traffic.

21. The method of claim 1, further comprising enforcing a maximum number of the sub-paths in the overall multi-path LSP.

22. The method of claim 1, further comprising:
evaluating the traffic statistics to determine whether the sub-paths are being utilized consistent with configured traffic-engineering requirements of the overall multi-path LSP, and
in response to the evaluating, dynamically updating a hash map to correct inconsistencies with respect to the configured traffic-engineering requirements.

23. The method of claim 1, wherein the overall multi-path LSP comprises a unicast LSP.

24. The method of claim 1, further comprising:
detecting a network failure; and
upon detecting the network failure, dynamically updating a hash map to re-balance network traffic across the sub-paths.

25. The method of claim 1, wherein establishing the overall multi-path LSP comprises:
by the ingress router, computing for the overall multi-path LSP the plurality of sub-paths to the egress device;
sending resource reservation requests to label-switching routers (LSRs) along two or more of the plurality of sub-paths of the overall multi-path LSP, wherein the resource reservation requests each include an identifier associating the requests with the same overall multi-path LSP, and wherein the resource reservation requests each include an indicator specifying the requested overall multi-path LSP as a load-balancing LSP; and
receiving resource reservation messages in response to the resource reservation requests that specify reserved resources and labels allocated to the overall multi-path LSP to be used for forwarding network traffic to corresponding next hops along the sub-paths of the overall multi-path LSP, wherein the resource reservation messages each include an identifier associating the messages with the same overall multi-path LSP, and wherein the resource reservation messages each include an indicator specifying the overall multi-path LSP as a load-balancing LSP.

26. The method of claim 1, wherein the tunnel interface comprises an Equal Cost Multipath (ECMP) interface mapped to each of the sub-paths of the overall multi-path LSP.

27. A network device comprising:
a resource reservation protocol module to establish an overall multi-path label switched path (LSP) from the network device to an egress device, wherein the overall multi-path LSP includes a plurality of different sub-paths to the egress device that satisfy a traffic-engineering constraint, wherein each of the sub-paths comprises a sub-LSP of the overall multi-path LSP, and wherein at least two of the sub-paths traverse different sets of nodes within a network between the ingress device and the egress device;
a forwarding component to forward received network traffic to the egress device over the overall multi-path LSP by load balancing the network traffic across the sub-paths of the overall multi-path LSP;
a physical interface configured to send the received network traffic across the sub-paths of the overall multi-path LSP; and
a load balancing module that analyzes traffic statistics for network traffic received at the network device on a tunnel interface associated with the overall multi-path LSP, wherein the load balancing module determines, based on the analysis of the traffic statistics, that a network traffic demand detected by the ingress device on the tunnel interface differs from a currently reserved bandwidth of the overall multi-path LSP by at least a threshold amount,
wherein in response to the determining, the network device automatically adds a sub-path to or removes a sub-path from the plurality of different sub-paths of the overall multi-path LSP to adjust capacity of the overall multi-path LSP to correspond to the network traffic demand.

28. The network device of claim 27, wherein the resource reservation protocol computes for the overall multi-path LSP a plurality of alternate sub-paths to the egress device that satisfy a set of traffic-engineering constraints;
wherein the physical interface is configured to send resource reservation requests generated by the resource reservation protocol to label-switching routers (LSRs)

along two or more of the plurality of sub-paths of the overall multi-path LSP, wherein the resource reservation requests include an identifier associating the requests with the same overall multi-path LSP, and wherein the resource reservation requests each include an indicator specifying the requested overall multi-path LSP as a load-balancing LSP, and receive resource reservation messages in response to the resource reservation requests that specify reserved resources and labels allocated to the overall multi-path LSP to be used for forwarding network traffic to corresponding next hops along the sub-paths of the overall multi-path LSP, wherein the resource reservation messages include an identifier associating the messages with the same overall multi-path LSP, and wherein the resource reservation messages each include an indicator specifying the overall multi-path LSP as a load-balancing LSP.

29. The network device of claim 27, wherein the traffic-engineering constraint includes a bandwidth requirement for the overall multi-path LSP, wherein a sum of bandwidth reserved along each of the sub-paths satisfies the bandwidth requirement for the overall multi-path LSP.

30. The network device of claim 27, wherein the resource reservation protocol module re-signals one or more of the plurality of sub-paths of the overall multi-path LSP to adjust an amount of currently reserved bandwidth on the sub-paths based on the network traffic demand.

31. The network device of claim 27, wherein the resource reservation protocol module adds a sub-path to the overall multi-path LSP by sending a resource reservation request along the sub-path to be added, wherein the resource reservation request includes the identifier associating the request with the same overall multi-path LSP, and wherein the resource reservation request includes an indicator specifying the overall multi-path LSP as a load-balancing LSP.

32. The network device of claim 27, wherein the resource reservation protocol module removes a sub-path to the overall multi-path LSP by sending a resource reservation PathTear message to tear down the sub-path, wherein the PathTear message includes the identifier associating the request with the same overall multi-path LSP, and wherein the PathTear message includes a sub-path identifier that identifies the sub-path to be torn down.

33. The network device of claim 27, wherein analyzing the traffic statistics comprises analyzing a rate of data traffic received for the tunnel interface associated with the overall multi-path LSP.

34. The network device of claim 27, wherein the load balancing module analyzes a maximum average traffic demand measured on the tunnel interface during a time interval.

35. The network device of claim 27, further comprising receiving configuration information specifying loading preferences that indicate a percent of available bandwidth capacity of each of the sub-paths of the overall multi-path LSP that should be utilized for the overall multi-path LSP before adding additional sub-paths.

36. The network device of claim 35, wherein, in response to the load balancing module determining that the plurality of sub-paths of the overall multi-path LSP do not have sufficient available bandwidth to accommodate the network traffic demand without going beyond the loading preferences, the load balancing module invokes the resource reservation protocol module to add one or more sub-paths to the plurality of sub-paths of the overall multi-path LSP.

37. The network device of claim 35, wherein, in response to the load balancing module determining that to decrease currently reserved bandwidth on each of the plurality of sub-paths of the overall multi-path LSP to adjust to a network traffic demand below the currently reserved bandwidth will result in each of the plurality of sub-paths having too little bandwidth with respect to the loading preferences, the load balancing module invokes the resource reservation protocol module to remove one or more sub-paths from the plurality of sub-paths of the overall multi-path LSP.

38. A computer-readable storage medium comprising instructions for causing a programmable processor to:
establish an overall multi-path label switched path (LSP) from an ingress device to an egress device, wherein the overall multi-path LSP includes a plurality of different sub-paths to the egress device that satisfy a traffic-engineering constraint, wherein each of the sub-paths comprises a sub-LSP of the overall multi-path LSP, and wherein at least two of the sub-paths traverse different sets of nodes within a network between the ingress device and the egress device;
forward received network traffic to the egress device over the overall multi-path LSP by load balancing the network traffic across the sub-paths of the overall multi-path LSP;
analyze traffic statistics for network traffic received at the ingress device on a tunnel interface associated with the overall multi-path LSP;
determine, based on the analysis of the traffic statistics, that a network traffic demand detected by the ingress device on the tunnel interface differs from a currently reserved bandwidth of the overall multi-path LSP by at least a threshold amount; and
in response to the determining, automatically add a sub-path to or remove a sub-path from the plurality of different sub-paths of the overall multi-path LSP to adjust capacity of the overall multi-path LSP to correspond to the network traffic demand.

39. The method of claim 1,
wherein establishing the overall multi-path LSP comprises sending, by the ingress router, a respective resource reservation request for establishing each of the respective sub-paths,
wherein each of the resource reservation requests indicates a common forwarding equivalence class (FEC) that identifies the overall multi-path LSP, and wherein each of the resource reservation requests indicates a different sub-path identifier that uniquely identifies the respective sub-path of the overall multi-path LSP.

* * * * *